(12) United States Patent
Dai et al.

(10) Patent No.: US 12,503,658 B2
(45) Date of Patent: Dec. 23, 2025

(54) MULTI-PHASE COMBINATION REACTION SYSTEM AND REACTION METHOD

(71) Applicants: CHINA PETROLEUM & CHEMICAL CORPORATION, Beijing (CN); SINOPEC DALIAN RESEARCH INSTITUTE OF PETROLEUM AND PETROCHEMICALS CO., LTD., Liaoning (CN)

(72) Inventors: Meng Dai, Liaoning (CN); Shicai Li, Liaoning (CN); Yang Li, Liaoning (CN); Dahai Xu, Liaoning (CN); He Ding, Liaoning (CN); Guang Chen, Liaoning (CN); Han Zhang, Liaoning (CN); Jiawen Zhou, Liaoning (CN)

(73) Assignees: CHINA PETROLEUM & CHEMICAL CORPORATION, Beijing (CN); SINOPEC DALIAN RESEARCH INSTITUTE OF PETROLEUM AND PETROCHEMICALS CO., LTD., Liaoning (CN)

( * ) Notice: Subject to any disclaimer, the term of this patent is extended or adjusted under 35 U.S.C. 154(b) by 344 days.

(21) Appl. No.: 18/250,047

(22) PCT Filed: Oct. 22, 2021

(86) PCT No.: PCT/CN2021/125492
§ 371 (c)(1),
(2) Date: Apr. 21, 2023

(87) PCT Pub. No.: WO2022/083714
PCT Pub. Date: Apr. 28, 2022

(65) Prior Publication Data
US 2023/0392085 A1    Dec. 7, 2023

(30) Foreign Application Priority Data

Oct. 22, 2020  (CN) .......................... 202011136718.5
Oct. 22, 2020  (CN) .......................... 202011136727.4
Oct. 22, 2020  (CN) .......................... 202011138182.0

(51) Int. Cl.
*C10G 49/00*      (2006.01)
*B01J 8/02*       (2006.01)
(Continued)

(52) U.S. Cl.
CPC ............ *C10G 49/002* (2013.01); *B01J 8/025* (2013.01); *B01J 8/0453* (2013.01); *B01J 8/0492* (2013.01);
(Continued)

(58) Field of Classification Search
CPC ...... C10G 49/002; C10G 65/08; C10G 65/16; C10G 2300/1044; C10G 2300/1051;
(Continued)

(56) References Cited

U.S. PATENT DOCUMENTS 3,425,810 A    2/1969  Scott, Jr.
5,114,562 A    5/1992  Haun et al.
10,173,194 B2  1/2019  Luo et al.

FOREIGN PATENT DOCUMENTS

CA    2753009 A1 *  4/2012  .......... C10G 21/003
CN    1488712 A     4/2004
(Continued)

OTHER PUBLICATIONS

CN 1552819 English translation (Year: 2004).*

*Primary Examiner* — Randy Boyer
*Assistant Examiner* — Juan C Valencia
(74) *Attorney, Agent, or Firm* — NKL Law; Allen Xue

(57) ABSTRACT

A multi-phase combination reaction system has at least one fixed bed hydrogenation reactor. The fixed bed hydrogena-
(Continued)

tion reactor has, arranged from top to bottom, a first hydrogenation reaction area, a gas-liquid separation area, a second hydrogenation reaction area and a third hydrogenation reaction area. The gas-liquid separation area is provided with a raw oil inlet. A hydrogen inlet is provided between the second hydrogenation reaction area and the third hydrogenation reaction area. The system is capable of simultaneously obtaining two fractions in one hydrogenation reactor.

20 Claims, 2 Drawing Sheets

(51) Int. Cl.
*B01J 8/04* (2006.01)
*C10G 65/08* (2006.01)
*C10G 65/16* (2006.01)

(52) U.S. Cl.
CPC .............. *C10G 65/08* (2013.01); *C10G 65/16* (2013.01); *B01J 2208/00823* (2013.01); *B01J 2208/00893* (2013.01); *B01J 2208/00991* (2013.01); *B01J 2208/025* (2013.01); *C10G 2300/1044* (2013.01); *C10G 2300/1051* (2013.01); *C10G 2300/1055* (2013.01); *C10G 2300/202* (2013.01); *C10G 2300/30* (2013.01); *C10G 2300/4006* (2013.01); *C10G 2300/4012* (2013.01); *C10G 2300/4018* (2013.01); *C10G 2300/4025* (2013.01); *C10G 2300/4037* (2013.01); *C10G 2400/04* (2013.01)

(58) Field of Classification Search
CPC ...... C10G 2300/1055; C10G 2300/202; C10G 2300/30; C10G 2300/4006; C10G 2300/4012; C10G 2300/4018; C10G 2300/4025; C10G 2300/4037; C10G 2400/04; C10G 65/04; C10G 65/00; B01J 8/025; B01J 8/0453; B01J 8/0492; B01J 2208/00823; B01J 2208/00893; B01J 2208/00991; B01J 2208/025; B01J 2208/00911; B01J 4/004; B01J 8/0496; B01J 8/04

See application file for complete search history.

(56) References Cited

FOREIGN PATENT DOCUMENTS

| | | | |
|---|---|---|---|
| CN | 1552819 | A * | 12/2004 |
| CN | 1277906 | C | 10/2006 |
| CN | 101343562 | A | 1/2009 |
| CN | 101343563 | A | 1/2009 |
| CN | 101942330 | A | 1/2011 |
| CN | 102041080 | A | 5/2011 |
| CN | 102051206 | A | 5/2011 |
| CN | 103102942 | A | 5/2013 |
| CN | 103627427 | A | 3/2014 |
| CN | 104449814 | A | 3/2015 |
| CN | 104611052 | A | 5/2015 |
| CN | 102834491 | B | 12/2015 |
| CN | 105154133 | A | 12/2015 |
| CN | 105295998 | A | 2/2016 |
| CN | 106520196 | A | 3/2017 |
| CN | 106520199 | A | 3/2017 |
| CN | 107177374 | A | 9/2017 |
| CN | 107345155 | A | 11/2017 |
| CN | 108728162 | A | 11/2018 |
| CN | 109022013 | A | 12/2018 |
| CN | 109722291 | A | 5/2019 |
| CN | 109722293 | A | 5/2019 |
| CN | 109722296 | A | 5/2019 |
| CN | 109777509 | A | 5/2019 |
| TW | 201319241 | A | 5/2013 |

* cited by examiner

MULTI-PHASE COMBINATION REACTION SYSTEM AND REACTION METHOD

TECHNICAL FIELD

The present invention relates to the technical field of oil refining and chemical engineering, and specifically discloses a multi-phase combination reaction system and reaction method.

BACKGROUND ART

Currently, the petroleum refining processes associated with the aspects of quality upgrading of oil products and product structure adjustment use fixed-bed reactors for carrying out the hydrorefining, hydrocracking and other reactions. In the fixed-bed reactor, the catalyst bed is fixed, the raw oil and hydrogen gas concurrently flow from top of the reactor downward through the catalyst bed to carry out the hydrogenation reaction, the refined oil flows out from the bottom of said reactor. Subsequently, the refined oil first enters the high-pressure separator to separate the hydrogen gas, and then enters a low-pressure separator to separate the low molecular hydrocarbons, and finally enters a fractionating tower to produce the products with different distillation ranges. Although the fixed-bed reactors and the flow schemes are widely used for the hydrogenation reaction, there are some problems. Firstly, in terms of chemical reactions, the fixed-bed hydrogenation is a three-phase reaction associated with the gas phase (hydrogen gas)—liquid phase (raw oil)—solid phase (catalyst), because both the hydrogen gas and the raw oil need to contact the catalyst for carrying out the reaction, the hydrogen gas must penetrate through the raw material liquid membrane on the catalyst surface so as to be adsorbed on the catalyst surface, the reaction is limited by the mass transfer resistance. The resistance will affect the chemical reaction rate and the efficient utilization of hydrogen gas to some extent. In addition, from the perspective of reaction environment inside the reactor, the hydrogenation of reactive substances in the raw oil is firstly performed at the top of said reactor; in the meanwhile, the reaction environment has a high hydrogen partial pressure and a low concentration of impurities, and the temperature is low due to the small amount of heat release.

However, along with the process that the raw material gradually flows downward along the catalyst bed, the remaining part of the raw oil is consisting of the macromolecular substances which can hardly perform a reaction, as the reaction requires higher hydrogen partial pressure and a suitable reaction temperature. However, due to the accumulation of $H_2S$, $NH_3$ and small molecular hydrocarbons in the reactor, the hydrogen partial pressure in the lower part of the reactor is significantly reduced. In addition, due to the large temperature rise, it is very disadvantageous to perform the reaction which is limited by the thermodynamic equilibrium (e.g. hydrogenation reaction of aromatic hydrocarbons). Therefore, the problem can only be industrially solved by decreasing the hourly space velocity of reaction or increasing a reactor, such that the production cost is increased. On the last hand, in terms of molecular economy, petroleum raw material is a very complex mixture rich in various kinds of alkanes, olefins, aromatic hydrocarbons as well as impurities (e.g., sulfur, nitrogen and metals), the different components are required to remain separately into products to meet the different quality requirements of products. However, the selectivity of the hydrogenation reaction is poor and essentially saturates all molecules capable of performing the hydrogenation reaction, which inevitably involves with the presence of unnecessary reactions or even reactions that should not occur, it will increase the consumption of hydrogen gas and go against the concept of molecular petroleum refining today. Therefore, the current hydrogenation reaction system can only be suitable for the production of a kind of product by using a raw material and filling the corresponding catalyst, the production of two or more products can hardly be performed in a single system under the condition of high utilization ratio of molecules.

To sum up, the co-current fixed bed hydrogenation reactors and processes at present have the defects such as poor chemical reaction efficiencies, less desirable reaction conditions and low utilization ratio of hydrogen gas, and poor reaction selectivity, the common defects are evident in the production of gasoline, diesel products, ethylene raw material, aviation kerosene products, the defects may be enumerated as follows:

Firstly, in an aspect of the production of gasoline and diesel products, due to the enforcement of the increasingly stringent environmental protection laws and regulations, which impose stringent requirements on the maximum content of aromatic hydrocarbons in the diesel products, in addition to stricter limits on the content of sulfur in the gasoline and diesel products. As stipulated in the National VI standards of gasoline in China, sulfur content is limited to not larger than 10 mg/kg, and as stipulated in the National VI standards of diesel in China, sulfur content is limited to not larger than 10 mg/kg, and the content of polycyclic aromatic hydrocarbons shall not larger than 7 m %.

Therefore, the deep hydrofinishing of gasoline and diesel raw material is needed such that the contents of sulfur, nitrogen and aromatic hydrocarbons meet the National Standards in China. During the diesel production process, the gases generated in the reactions such as $H_2S$, $NH_3$ will be adsorbed on the active centers on the catalyst surface, thereby inhibiting an effective performance of the catalyst. In addition, the existence of $H_2S$, $NH_3$ and gaseous light hydrocarbons will reduce the partial pressure of hydrogen gas, which in turn affects the degree of aromatic hydrogenation saturation. While in the conventional co-current hydrogenation process of gas and liquid, $H_2S$ is increasingly enriched along with the flow of material, the effect of deep desulfurization and dearomatization is poorer at the place closer to the bottom of said reactor. In addition, the production of gasoline and diesel at present can hardly be accomplished in the same reactor and system, requiring at least two set of complete hydrogenation reactors and supported process schemes, the reason is that if the raw material of gasoline and diesel enters the same reactor at the same time, olefins in the gasoline component will saturate and the octane value of the gasoline product is lowered due to the selectivity of the hydrogenation reaction.

As for the problem concerning deep desulfurization effects of $H_2S$, $NH_3$ and the like, the gas-liquid countercurrent hydrogenation process has certain advantages over the conventional fixed-bed co-current process, namely the gas-liquid countercurrent hydrogenation process relates to that the hydrogen gas enters from the bottom of a reactor, the raw material is introduced from the top of said reactor, and by using the upward steam stripping action of hydrogen gas, most of the hydrogen sulfide in a gaseous phase is carried out of the reactor unit from the top of said reactor, thereby avoiding its effects on deep desulfurization. Moreover, since hydrogen gas enters from the bottom of said reactor, the hydrogen partial pressure is higher at the bottom of the reactor, which facilitates deep saturation of the macromolecular aromatic hydrocarbons enriched therein. However, during the gas-liquid countercurrent process, flooding phenomenon is prone to occur in the reactor, the main reason is that the light hydrocarbons produced during the reaction process are liquefied at the top of said reactor and returned into the reactor, the light hydrocarbons entering the reaction area is re-vaporized, thereby increasing the flow amount and flow rate of the upward-flowing gas phase, and also increasing the flow resistance, such that the flow rate of downward-flowing liquid becomes slower, the liquid hold-up in the reactor is increased, which in turn causes flooding, reducing the gas-liquid mass transfer efficiency, and carrying the unreacted liquid components out of the reaction system.

The problem that the flooding easily occurs in the gas-liquid countercurrent reactor has not been substantially solved. During the deep hydrodesulfurization process, the gas-liquid countercurrent reactor needs to provide an effective concentration of hydrogen gas, ensure a mass transfer rate of the reactants, facilitating an occurrence of the deep hydrogenation reaction, and it needs to minimize the gaseous phase impurities generated during the reaction process as well as the frictional resistance between the light hydrocarbons and the liquid phase oil products, thereby inhibiting an occurrence of the flooding. However, since the gas phase light hydrocarbons can only flow upwards along with the hydrogen gas, if the gas phase light hydrocarbons do not flow out of the reactor along with the hydrogen gas, the light hydrocarbons again form a liquid phase and flow downwards, and enter the severe reaction area and again form a gas phase, resulting in the enrichment of the light hydrocarbons at the top of said reactor, and an occurrence of flooding. The main means of controlling the flooding in the prior art include changing the porosity of the catalyst bed, increasing the bypass of the gas phase flow, increasing the communication area of the gas and liquid through the upper part of the reactor, and providing an internal component with a function of gas collection.

CN1552819A discloses a light hydrocarbon hydrogenation method, which provides two reactors, using two reaction environments with the counter-current and co-current mode, the method is mainly used for upgrading processes of inferior gasoline. However, the method has complicated process, and the flow rate of hydrogen gas in the two reactors cannot be controlled accurately, which easily causes a large influence on the hydrogenation reaction.

CN1488712A discloses a diesel hydrotreating method, which increases the gas-liquid volume ratio in the counter-current reactor and reduces the probability of flooding by using a combination of catalysts with different porosities. However, the process of controlling the porosity of the bed layers by filling the catalysts with different external structures imposes a high requirement on the filling operation during the actual filling process, it is difficult to achieve the desired state. In addition, the method cannot avoid an occurrence of flooding phenomenon under the condition of the high amount of back mixing of the gas and liquid.

Secondly, in the aspect of producing ethylene raw material through the hydrogenation of naphtha. In recent years, the ethylene industry has gradually exhibiting the development trends of increasingly large scale and industrially intensive, and the demand for ethylene cracking raw material has been rising. Currently, the production technology of ethylene is dominated by steam cracking technology, the raw material of preparing ethylene from steam cracking of distillate oil are mainly the naphtha, hydrocracking tail oil and light diesel. Wherein the naphtha fraction, which has a high content of chain alkanes and moderate chain length, is a relatively high quality cracking raw material for preparing ethylene, and accounts for about 60% of the raw material for preparing ethylene. However, the naphtha fraction is also used as a raw material for catalytic reforming to produce aromatic hydrocarbons or gasoline blending components, but it has a problem of competing the raw material with the cracking process for preparing ethylene. Under the overall trend of reducing output of diesel among the refinery plants, it is also an excellent solution to use diesel as the ethylene raw material, but the diesel contains a limited amount of chain alkanes, has low yields of ethylene and propylene, and a high content of polycyclic aromatic hydrocarbons, it will shorten the operating cycle of cracking furnaces. Therefore, the acidic catalysts are needed to partially hydrogenate the polycyclic aromatic hydrocarbons in the diesel raw material and open the rings to generate long side chains, which can improve olefin yields and slow coke formation in cracking furnaces due to that the long side chains have desirable cracking performance for preparing ethylene. However, the acidic catalysts impose high requirements on the reaction environment, especially the $NH_3$ species on their surface may cause a large attenuation of catalyst activity, and the problem is not desirably addressed by the conventional fixed bed diesel hydrocracking technology. Moreover, in the steam cracking process, the different fractions of petroleum products are fed from different feed systems into the cracking reaction area, thus the steam cracking process for preparing ethylene may be provided with different raw material fractions, the naphtha and diesel are respectively subjected to hydrorefining/cracking, which requires at least two set of complete hydrogenation system processes such as heat exchange, reaction and steam stripping, thus the costs are high.

CN102051206A discloses a method for producing ethylene cracking raw material by hydrofining naphtha, the effects of deep desulfurization, denitrogenation and removal of aromatic hydrocarbons can be achieved by adding two molecular sieves to the hydrogenation catalyst for performing synergy. The refined oil can be used as catalytic reforming raw material or cracking raw material for preparing ethylene, however, under the principle of "producing olefins and/or aromatic hydrocarbons with appropriate raw material", the naphtha fraction needs to balance the production of gasoline, aromatic hydrocarbons and ethylene, it cannot overcome the insufficiency of ethylene raw material. CN102041080A discloses an integrated method for hydrocracking and producing ethylene cracking material by subjecting the hydrocracking tail gas to further fractionation with reduced pressure and using the light distillate fraction as the raw material for preparing ethylene through steam cracking, but the ethylene yield is limited.

Thirdly, in the aspect of aviation kerosene production. When facing with the continuously increasing demand for aviation kerosene production, the oil refineries may adopt a means of cutting the heavy and straight-run distillation aviation kerosene fraction for the purpose of stimulating the aviation kerosene production; however, an increased content of straight chain alkanes and aromatic hydrocarbons in the cut heavy components may causes an off-specification circumstance of both freezing point and smoke point of the aviation kerosene products, and it is difficult to significantly improve the two indicators under the restraints of the pressure design grade and hydrogenation reaction characteristics of the existing aviation kerosene plant. Therefore, although the limitation of the final distillation point in the aviation kerosene quality index is not larger than 300° C., the oil refineries are currently controlling the final distillation point of aviation kerosene to be not larger than 260° C. with the purpose of ensuring the on-specification of freezing point and smoke point of the aviation kerosene, thus the increased production of aviation kerosene cannot be realized.

With respect to the problem of an off-specification smoke point of the aviation kerosene with cut weight fraction due to the elevated content of aromatic hydrocarbons, given that the pressure rating of the existing facility cannot be further increased, the problem can be solved by means of adopting the gas-liquid countercurrent process, and accomplishing saturation of aromatic hydrocarbons in the high hydrogen partial pressure area at the bottom of the reactor; however, the problem of flooding is not desirably solved at present, the content has been previously mentioned and will not be repeated herein.

In regard to the problem of an off-specification freezing point of the aviation kerosene caused by elevated straight chain alkanes therein, the isomerization catalysts can be used, however, the first problem resides in that the isomerization catalysts are acidic catalysts which are susceptible to adsorption by $NH_3$ and other substances, thus the catalyst activity is influenced; the second problem resides in that with respect to the raw material of the aviation kerosene with cut weight fraction, the isomerization of only a portion of the increased alkanes is required, if the whole fractions of said aviation kerosene contact the catalyst, the selective reaction of the macromolecular straight chain alkanes and the service life of said isomerization catalyst will be affected.

CN107345155A proposes a hydrocracking process, which converts the diesel into the jet fuel with a low freezing point by preparing a Y molecular sieve which is rich in mesopores and is concentrated in effective pore size distribution. However, the technology currently accounts for a small share in the production of avitation kerosene and suffers from the defects such as high hydrogen consumption and energy consumption and low yield of aviation kerosene. CN109722291A proposes a method for reducing freezing point of high dry point aviation kerosene, the method uses diesel as the raw material, and carries out isomerization reaction by designing a freezing point reducing catalyst, and performs synergy of molecular sieves with different pore sizes, and avoids excessive cracking by carrying out a pre-refining process before the isomerization process, so as to produce the aviation kerosene with a low freezing point and the diesel product simultaneously.

However, the process relates to the isomerization of whole diesel fraction, which will reduce the service life of the isomerization catalyst to some extent, and also affect the cetane number of the diesel product.

SUMMARY OF THE INVENTION

In order to solve the defects in the prior art, the present invention provides a multi-phase combination reaction system and reaction method. The process of the present invention are capable of simultaneously obtaining two fractions in one hydrogenation reactor, which are used for gasoline, diesel products, aviation kerosene products and ethylene raw material, etc., and also capable of preventing flooding phenomenon in the hydrogenation reactor.

In a first aspect, the present invention provides a multi-phase combination of reaction system, the system comprises at least one fixed bed hydrogenation reactor, the fixed bed hydrogenation reactor comprise, arranged from top to bottom, a first hydrogenation reaction area, a gas-liquid separation area, a second hydrogenation reaction area and a third hydrogenation reaction area; the gas-liquid separation area is provided with a raw oil inlet; a hydrogen inlet is provided between the second hydrogenation reaction area and the third hydrogenation reaction area;

the gas-liquid separation area is used for separating the raw oil into a gas phase A and a liquid phase A;

the first hydrogenation reaction area is used for carrying out a first hydrogenation reaction between the gas phase A and hydrogen gas;

the second hydrogenation reaction area is used for performing a gas-liquid countercurrent reaction between the liquid phase A and the hydrogen gas from the hydrogen inlet to obtain a material B;

the third hydrogenation reaction area is used for carrying out a third hydrogenation reaction of the hydrogen-dissolved material B.

In a second aspect, the present invention provides a multi-phase combination of reaction method, the method is carried out in a system comprising at least one fixed bed hydrogenation reactor, the fixed bed hydrogenation reactor comprise, arranged from top to bottom, a first hydrogenation reaction area, a gas-liquid separation area, a second hydrogenation reaction area and a third hydrogenation reaction area; the gas-liquid separation area is provided with a raw oil inlet; a hydrogen inlet is provided between the second hydrogenation reaction area and the third hydrogenation reaction area;

the method includes the following steps:

(1) subjecting the raw oil to a gas-liquid separation in the gas-liquid separation area to obtain a gas phase A and a liquid phase A;

(2) introducing a hydrogen gas from the hydrogen inlet arranged between the second hydrogenation reaction area and the third hydrogenation reaction area, subjecting the hydrogen gas and the liquid phase A to a gas-liquid countercurrent reaction in the second hydrogenation reaction area to obtain a material B;

subjecting the unreacted hydrogen gas and the gas phase A to a first hydrogenation reaction in the first hydrogenation reaction area to obtain a material C;

(3) a hydrogen-dissolved material B downward entering the third hydrogenation reaction area for carrying out a third hydrogenation reaction to obtain a material D.

The system and method provided by the present invention have the following advantages over the prior art:

(1) In the traditional gas-liquid-solid three-phase reactions, the gas-phase hydrogen needs to penetrate the liquid-phase raw oil to reach a surface of the solid-phase catalyst, which is limited by diffusion, thus the reaction efficiency is affected. The present invention skillfully sets the upper reaction area, middle reaction area and lower reaction area (i.e., a first hydrogenation reaction area, a second hydrogenation reaction area and a third hydrogenation reaction area) into a gas-solid reaction area, a gas-liquid-solid reaction area and a liquid-solid reaction area, wherein the two-phase reaction with higher mass transfer efficiency is carried out in the hydrorefining area at the upper part and lower part respectively, and the middle reaction area adopts the reverse contact of gas phase and liquid phase to strengthen the driving force of gas-liquid mass transfer, improve the reaction efficiency as a whole, thereby increasing the utilization rate of hydrogen gas. Compared with conventional technologies, the hydrogen consumption (the mass of hydrogen consumed per unit mass of raw material) can be reduced. At the same time, the coupling effect of the three reaction areas provided in the present invention can ensure that the reaction system is more stable. When the gas-liquid reverse contact in the second hydrogenation reaction area strengthens the mass transfer process, it is accompanied with back-mixing, the stable pressure control is required during the process. The uppermost first hydrogenation reaction area has a large compressible gas phase space, which desirably plays a buffer role for stabilizing the bed layer pressure and keeping the flowing state of fluid; the flow rate of gas phase and the thickness of liquid layer in the second hydrogenation reaction area can be adjusted by flexibly controlling the air flow at an outlet, so as to reduce the possibility of flooding. The effluent of the second hydrogenation reaction area, after contacting with pure hydrogen, subjects to heat transfer and cooling, and rapidly enters the third hydrogenation reaction area at the underneath, which avoids the effusion of hydrogen gas after the hydrogen gas entering the reactor after the hydrogen mixing process in the conventional liquid-phase hydrogenation technology. The third hydrogenation reaction area at the underneath is the liquid phase space, which can desirably control the state of material at an outlet of the reactor. If this area is not arranged, it will cause the problem that hydrogen gas is carried out of the reactor without passing through the catalyst bed layer and performing reaction, the arrangement of this area can save the high-pressure separator in the conventional technological process and simplify the process.

(2) In the present invention, in addition to satisfying the chemical hydrogen consumption required by the reaction of each reaction area, the flow rate of hydrogen gas at the inlet can also be flexibly adjusted according to the properties of the raw material and product requirements, so as to stabilize the reaction phase state of each reaction area, adjust the hydrogen partial pressure and reduce the content of impurities. The hydrogen inlet is disposed below the second hydrogenation reaction area, and the operating conditions can be adjusted to control the percentage of hydrogen gas moving upward in the gas phase and moving downward in the liquid phase, such that hydrogen gas exists in the gas phase in the first hydrogenation reaction area and the second hydrogenation reaction area, and hydrogen gas exists in the liquid phase in the third hydrogenation reaction area. Since the second hydrogenation reaction area has the highest requirement for hydrogen partial pressure, the position of the hydrogen inlet can satisfy the highest hydrogen partial pressure in this area, which is conducive to the optimization of the reaction environment with high requirement of hydrogen partial pressure and low concentration of impurities. During the upward and downward flow process of hydrogen gas, along with the generation of light hydrocarbons and impurities and the hydrogen consumption of the reaction, the hydrogen partial pressure in the first hydrogenation reaction area and the second hydrogenation reaction area gradually decreases, but the hydrogen consumption of the chemical reaction can still be satisfied without the need for a large amount of excess hydrogen from top to bottom in the traditional fixed bed reactors, such that the hydrogen consumption of the device is greatly reduced. In the second hydrogenation reaction area, the hydrogen gas is in countercurrent contact with the reaction raw material, and the gas-phase components (including hydrogen gas, small molecular hydrocarbons, $H_2S$, etc.) move upward and contact the raw material going downward in the gas-liquid separation area, then carry out mass transfer and separation, which can strengthen an effect of separating the light component and heavy component in the raw material, and carry impurities and rapidly move upward to flow out of the reactor, so as to avoid the influence of $H_2S$ and $NH_3$ on the catalyst activity of the second hydrogenation reaction area and the third hydrogenation reaction area, and also carry the light components generated by the reaction to the first hydrogenation reaction area as the product or blending component which flows out of the reactor, thereby avoiding further cracking caused by excessive residence time of hydrogen gas on the acidic catalyst and reducing excessive hydrogenation reactions. At the same time, given that the amount of hydrogen gas is adjustable, the gas velocity can be adjusted according to the changes in the gasification rate and liquid phase fraction of the raw material in the reactor, in order to prevent flooding in the second hydrogenation reaction area.

(3) The present invention adopts the suitable feeding method of raw oil, and the combined action of the gas-liquid separation area and third hydrogenation reaction area, when using inferior gasoline and diesel raw material, mixed raw material of inferior gasoline and diesel, or the aviation kerosene with cut weight fraction as the raw material, the monocyclic aromatic hydrocarbons, olefins, alkanes and small molecular sulfides, as well as the light components generated in the third hydrogenation reaction area are further enriched in the first hydrogenation reaction area, so as to saturate olefins and remove impurities. At the same time, the liquid phase material in the second hydrogenation reaction area is the hydrocarbon substance containing a large amount of macromolecular aromatic hydrocarbons, long-chain alkanes, the hydrogenation reaction and isomerization reaction are more targeted, which can further increase reaction space and increase the device throughput. In the third hydrogenation reaction area, if a low hydrogen consumption reaction occurs, the conditions can be met only by carrying dissolved hydrogen, the reaction condition can be satisfied by merely depending on the dissolved hydrogen, so as to carry out the hydrogenation reaction by sufficiently utilizing the dissolved hydrogen, without the need of further cooling the material flowing out of the reactor and separating the excessive hydrogen gas, the heat transfer device in the conventional technology is saved. As for the reactions with high hydrogen consumption, the equipment with enhanced hydrogen dissolution can be provided.

EXPLANATION OF THE REFERENCE SIGNS

1—Raw oil inlet
2—Hydrogen inlet
3—First hydrogenation reaction area

4—Gas-liquid separation area
5—Second hydrogenation reaction area
6—Third hydrogenation reaction area
7—Naphtha fraction
8—Diesel fraction
9—Light fraction discharge pipeline
10—Heavy fraction discharge pipeline
11—Aviation kerosene products

DESCRIPTION OF THE PREFERRED EMBODIMENT

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined with one another to produce one or more new numerical ranges, which should be deemed have been specifically disclosed herein.

In the description of the present invention, it should be understood that the orientation or positional relationship indicated by the terms "upper", "lower", "top", "bottom" and the like is based on the orientation or positional relationship shown in the accompanying drawings, the terms only serve to facilitate description of the present invention and simplify the description, instead of explicitly indicating or implicitly indicating that the device or element referred to must have a particular orientation, or be constructed and operated in a particular orientation, thus the terms should not be construed as limiting the present invention. In addition, the terms "inside and outside" refers to the inside and outside with respect to the contour of each component per se.

In the present invention, the symbol "≯" indicates that it is not larger than, and the symbol "≮" indicates that it is not less than.

In the present invention, the second hydrogenation reaction area can also be referred to as a gas-liquid countercurrent reaction area.

Figure 1:
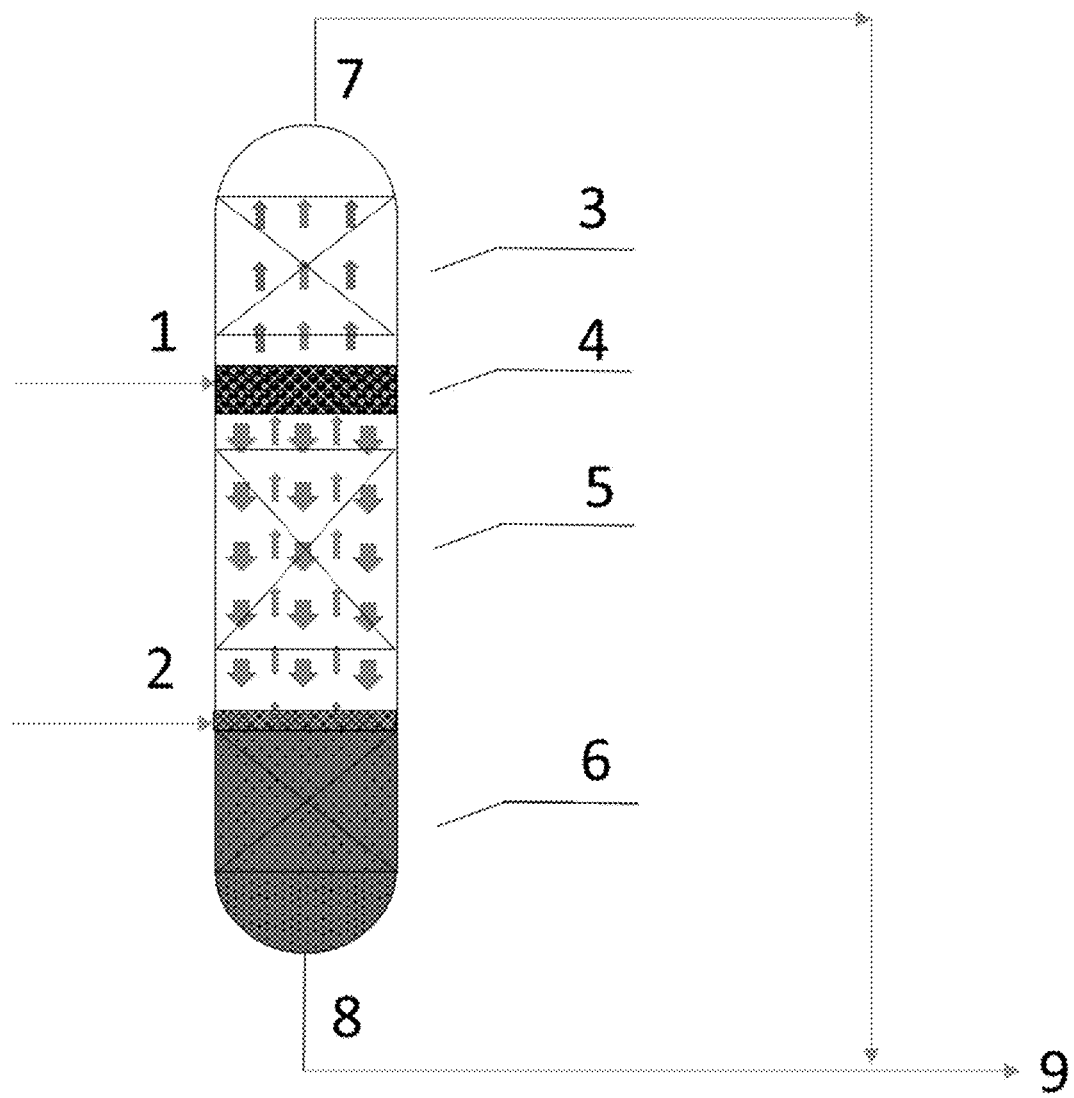
FIG. 1 illustrates a reaction system of the multi-phase combination according to a specific embodiment provided by the present invention.

In a first aspect, the present invention provides a multi-phase combination of reaction system, as shown in FIG. 1, the system comprises at least one fixed bed hydrogenation reactor, the fixed bed hydrogenation reactor comprise, arranged from top to bottom, a first hydrogenation reaction area 3, a gas-liquid separation area 4, a second hydrogenation reaction area 5 and a third hydrogenation reaction area 6; the gas-liquid separation area is provided with a raw oil inlet 1; a hydrogen inlet 2 is provided between the second hydrogenation reaction area and the third hydrogenation reaction area; the gas-liquid separation area is used for separating the raw oil into a gas phase A and a liquid phase A;

the first hydrogenation reaction area is used for carrying out a first hydrogenation reaction between the gas phase A and hydrogen gas;
the second hydrogenation reaction area is used for performing a gas-liquid countercurrent reaction between the liquid phase A and the hydrogen gas from the hydrogen inlet to obtain a material B;
the third hydrogenation reaction area is used for carrying out a third hydrogenation reaction of the hydrogen-dissolved material B.

The multi-phase combination of reaction system in the present invention refers to that in the reaction system, reactions of multiple phases can be carried out at the same time, specifically, a gas-solid reaction is carried out in the first hydrogenation reaction area; a gas-liquid-solid reaction is performed in the second hydrogenation reaction area; a liquid-solid reaction is performed in the third hydrogenation reaction area.

The present invention can control the reaction types and conditions of different reaction areas, and improve the reaction depth and conversion rate by partitioning in one reactor. In addition, the hydrogenation reaction in the whole reactor is organically decomposed and integrated, which greatly reduces the gas-liquid countercurrent contact area (only the second hydrogenation reaction area in the present invention is the gas-liquid countercurrent contact area) and prevents flooding phenomenon. In the present invention, the hydrogen gas is introduced underneath the second hydrogenation reaction area, which not only facilitates to control the bed temperature of the first hydrogenation reaction area and the second hydrogenation reaction area, but also ensures a relatively high hydrogen partial pressure in the second hydrogenation reaction area. Such a reaction environment is beneficial to an occurrence of hydrorefining reaction in the second hydrogenation reaction area, and the second hydrogenation reaction area acts as the pre-refining area of the third hydrogenation reaction area, which can effectively avoid the poisoning and deactivation of the catalyst in the third hydrogenation reaction area, prolong the service life of said catalyst, and realize the effective utilization of heat energy. In the meanwhile, the hydrogen gas can carry the reaction heat to the first hydrogenation reaction area at the upper side, which can effectively compensate for the temperature drop of the gas-liquid separation area caused by the gas-liquid separation process, and prevent the gas phase generated in the second hydrogenation reaction area from condensing and refluxing due to the temperature drop. On the other hand, since the gas-phase light hydrocarbons flow upward through the first hydrogenation reaction area and are discharged outside, there is no liquid reflux in the first hydrogenation reaction area, which avoids an increased gas-liquid flow resistance in the traditional gas-liquid countercurrent device caused by that the gas-phase light hydrocarbons needs to flow back to the bottom of the reactor and discharged from the device; the liquid phase entering the third hydrogenation reaction area is almost free of micromolecular hydrocarbons and hydrogen sulfide, which is beneficial to increase the solubility of hydrogen gas in the liquid phase and further promote the hydro-upgrading/isomerization reaction of the liquid phase.

The reaction system provided by the present invention has the advantages of long operation period and low equipment investment and operation costs.

In the present invention, the number of fixed bed hydrogenation reactors in the reaction system and the connection method are not particularly limited, there may be one, two or more fixed bed hydrogenation reactors, and the fixed bed hydrogenation reactors may be connected in series, or be connected in parallel, or may be connected in series and in parallel at the same time. Those skilled in the art can make appropriate selections according to the handling capacity and processing precision of the reaction system.

According to the reaction system provided by the present invention, preferably, the first hydrogenation reaction area, the second hydrogenation reaction area and the third hydrogenation reaction area are respectively filled with a first hydrogenation catalyst, a second hydrogenation catalyst and a third hydrogenation catalyst. The reaction system provided by the present invention can treat different raw oils by separately filling the first hydrogenation reaction area, the second hydrogenation reaction area and the third hydrogenation reaction area with the hydrogenation catalyst having different function, and further cooperating with the control of operating conditions.

According to the reaction system provided by the present invention, preferably, a mixed hydrogen-dissolving component or equipment is provided between the second hydrogenation reaction area and the third hydrogenation reaction area, and the mixed hydrogen-dissolving component or equipment is used for improving solubility and/or dispersity of hydrogen gas in oil products. An use of the preferred embodiment can increase the solubility and/or dispersity of hydrogen gas in the material B, which is more favorable for the hydrogenation reaction in the third hydrogenation reaction area.

The present invention does not impose particular limitation on the specific selection of the mixed hydrogen-dissolving component or equipment, as long as the above-mentioned effects can be achieved. Preferably, the mixed hydrogen-dissolving component or equipment is at least one of a membrane-tube type hydrogen-dissolving component, a hydrogen mixer (e.g., it may be a high-efficiency hydrogen mixer), a microbubble generator and a bubble fractal device. For example, a hydrogen mixer with strong convective back-mixing or a hydrogen mixer with micro-channels to generate micro-bubbles is used to increase the solubility. Preferably, a support tray with uniformly distributed pores and downcomers is used for improving the dispersity of the gas phase.

The membrane-tube type hydrogen-dissolving component, the hydrogen mixer, the microbubble generator and the bubble fractal device described in the present invention have conventional definitions in the technical field, the content will not be repeated herein.

According to the reaction system provided by the present invention, preferably, the gas-liquid separation area is provided with an internal component that facilitates gas-liquid separation. That is, under the preferred embodiment, the gas-liquid separation area is provided with an internal component that facilitates gas-liquid separation, which is more conducive to separating the raw oil into the gas phase A and the liquid phase A. Preferably, the internal component that facilitates gas-liquid separation is an enhanced flash evaporator and/or a liquid flash evaporation distributor.

According to a specific embodiment of the present invention, the top of said fixed bed hydrogenation reactor is provided with a light fraction discharge pipeline 9, and the bottom of said fixed bed hydrogenation reactor is provided with a heavy fraction discharge pipeline 10.

Figure 2:
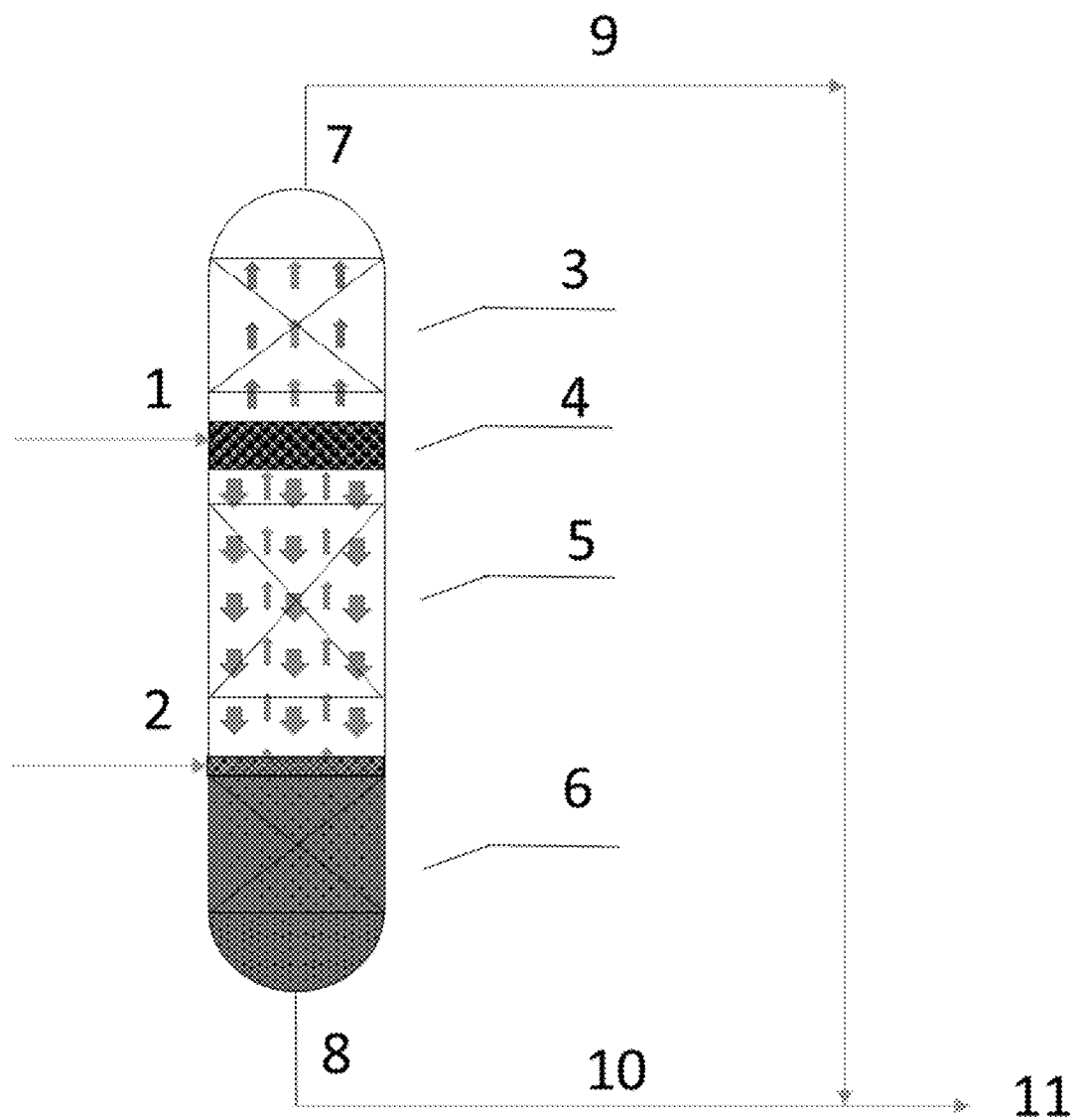
FIG. 2 illustrates a reaction system of the multi-phase combination according to another specific embodiment provided by the present invention.

According to a preferred embodiment of the present invention, as shown in FIG. 2, the light fraction discharge pipeline is connected with the heavy fraction discharge pipeline to blend a light fraction obtained from the light fraction discharge pipeline and a heavy fraction obtained from the heavy fraction discharge pipeline.

The products obtained from the light fraction discharge pipeline and the heavy fraction discharge pipeline of the reaction system provided by the present invention can be used alone as a product, or can be mixed together and blended to form a product.

In a second aspect, the present invention provides a multi-phase combination of reaction method, the method is carried out in a system comprising at least one fixed bed hydrogenation reactor, the fixed bed hydrogenation reactor comprise, arranged from top to bottom, a first hydrogenation reaction area, a gas-liquid separation area, a second hydrogenation reaction area and a third hydrogenation reaction area, the gas-liquid separation area is provided with a raw oil inlet, a hydrogen inlet is provided between the second hydrogenation reaction area and the third hydrogenation reaction area;

the method includes the following steps:
(1) subjecting the raw oil to a gas-liquid separation in the gas-liquid separation area to obtain a gas phase A and a liquid phase A;
(2) introducing a hydrogen gas from the hydrogen inlet arranged between the second hydrogenation reaction area and the third hydrogenation reaction area, subjecting the hydrogen gas and the liquid phase A to a gas-liquid countercurrent reaction in the second hydrogenation reaction area to obtain a material B;
subjecting the unreacted hydrogen gas and the gas phase A to a first hydrogenation reaction in the first hydrogenation reaction area to obtain a material C;
(3) a hydrogen-dissolved material B downward entering the third hydrogenation reaction area for carrying out a third hydrogenation reaction to obtain a material D.

According to a preferred embodiment of the present invention, the raw oil is selected from a group consisting of raw material of inferior gasoline and diesel, a mixed raw material of gasoline and diesel, or an aviation kerosene raw material with cut weight fraction. The method provided by the present invention is suitable for the treatment of various raw oils to achieve different production purposes.

The method of the gas-liquid separation is not particularly limited in the present invention, it may be various means commonly used in the art to perform the gas-liquid separation, preferably flash evaporation.

According to a preferred embodiment A of the present invention, the raw oil is a mixed raw material of gasoline and diesel. The method provided by the present invention is adopted to produce ethylene steam cracking raw material.

In the preferred embodiment, the method includes: the fixed bed hydrogenation reactor comprise, arranged from top to bottom, a first hydrogenation reaction area, a gas-liquid separation area, a second hydrogenation reaction area and a third hydrogenation reaction area; the gas-liquid separation area is provided with a raw oil inlet; a hydrogen inlet is provided between the second hydrogenation reaction area and the third hydrogenation reaction area; the mixed raw material of gasoline and diesel enters the gas-liquid separation area from the raw oil inlet, and is subjected to a gas-liquid separation and separated into naphtha fraction and diesel fraction, the naphtha fraction flows upward into the first hydrogenation reaction area, the diesel fraction flows downward into the second hydrogenation reaction area, and hydrogen gas is introduced from a hydrogen inlet between the second hydrogenation reaction area and the third hydrogenation reaction area; the hydrogen gas moves upward and subjects to the deep hydrodesulfurization and denitrogenation reactions in the second hydrogenation reaction area with the diesel fraction; the reacted material downward enter a third hydrogenation reaction area to carry out the selective hydrogenation and ring-opening reactions of polycyclic aromatic hydrocarbons, the obtains material D is the ethylene cracking raw material of the diesel fraction; the unreacted hydrogen gas continues to flow upward through the gas-liquid separation area into the first hydrogenation reaction area, and subjected to hydrodesulfurization, hydrodenitrogenation and olefin saturation reactions with naphtha fraction, the obtained material C is the ethylene cracking raw material of the naphtha fraction.

In this preferred embodiment, the gas phase A is naphtha fraction, and the liquid phase A is diesel fraction. In step (2), hydrogen gas and the liquid phase A are subjected to deep hydrodesulfurization and hydrodenitrogenation reactions in the second hydrogenation reaction area to obtain a material B; the unreacted hydrogen gas and the gas phase A are subjected to hydrodesulfurization, hydrodenitrogenation and olefin saturation reactions in the first hydrogenation reaction area, and the obtained material C is an ethylene cracking raw material of the naphtha fraction;

In step (3), the hydrogen-dissolved material B downward enters the third hydrogenation reaction area for carrying out the selective hydrogenation, saturation and ring-opening reactions of polycyclic aromatic hydrocarbons, the obtained material D is an ethylene cracking raw material of the diesel fraction;

According to the present invention, the mixed raw material of gasoline and diesel refers to the mixed oil of naphtha fraction and diesel fraction, preferably containing the straight-run distillate fraction and coking fraction as the main ingredients. If the catalytic cracking secondary oil is added for refining, its content is preferably not larger than 20%; preferably, the mixed raw material of gasoline and diesel has a distillation range of 40-370° C., a content of S not larger than 12,000 g/g, a content of N not larger than 300 g/g, and a content of polycyclic aromatic hydrocarbons not larger than 50 wt %.

In this preferred embodiment, the first hydrogenation reaction area is used for subjecting the naphtha fraction to the desulfurization, denitrogenation and olefin saturation reactions.

According to the present invention, the selection range of the catalyst filled in the first hydrogenation reaction area is wide, as long as the hydrodesulfurization, hydrodenitrogenation and olefin saturation reactions of the gas phase A can be performed. Preferably, the first hydrogenation reaction area is filled with a light distillate oil hydrogenation catalyst, more preferably a Mo—Ni or Mo—Co type light distillate oil hydrogenation catalyst. The light distillate oil hydrogenation catalyst includes a carrier and an active metal component supported on the carrier. The present invention has a wide selection range for the types of the carrier and the active metal component and the content of said carrier and active metal component. For example, the carrier, including but not limited to $\gamma$-$Al_2O_3$ and any $Al_2O_3$ modified with additives, etc., the active metal component includes at least one of VIB metals (preferably Mo and/or W) and at least one of Group VIII metals (preferably Ni and/or Co). Preferably, based on the total amount of the light distillate oil hydrogenation catalyst, the content of the carrier is 70-90 wt %, and the content of the active metal component is 10-30 wt % in terms of oxides.

According to a preferred embodiment of the present invention, the light distillate oil hydrogenation catalyst is FH-40 series special catalyst for light distillate oil hydrogenation developed by the Sinopec Fushun Research Institute of Petroleum and Petrochemicals (FRIPP), and further preferably FH-40C catalyst commonly used in naphtha hydrogenation.

Preferably, based on the total volume of the catalyst filled in the fixed bed hydrogenation reactor, the volume ratio of the catalyst filled in the first hydrogenation reaction area is within a range of 1-60%, preferably 10-40%.

According to the present invention, preferably, the volume ratio of total hydrogen to oil in the fixed bed hydrogenation reactor is 10:1-800:1, more preferably 100:1-600:1.

According to a preferred embodiment of the present invention, the operating conditions of the first hydrogenation reaction area comprise: a pressure of 1.0-12.0 MPa, preferably 2.0-6.0 MPa, wherein the hydrogen partial pressure accounts for 40%-70% of the total pressure; a volume space velocity of 0.1-10.0 $h^{-1}$, preferably 3.0-8.0 $h^{-1}$; and a reaction temperature of 100-350° C., preferably 200-280° C. Preferably, among the operating conditions of the first hydrogenation reaction area, the volume ratio of hydrogen to oil is 10:1-800:1, more preferably 100:1-600:1.

According to the present invention, preferably, the operating conditions of the gas-liquid separation area comprises: a feed temperature of 150-300° C., more preferably 220-280° C.

In the preferred embodiment, the second hydrogenation reaction area is used for deep desulfurization and denitrogenation of diesel fraction. Preferably, the second hydrogenation reaction area is filled with a diesel hydrogenation catalyst, preferably a Mo—Ni and/or Mo—Co type diesel hydrogenation catalyst.

According to the present invention, the selection range of catalyst for the second hydrogenation reaction area is wide, as long as the deep desulfurization and denitrogenation of diesel fraction can be performed. Preferably, the second hydrogenation reaction area is filled with a diesel hydrogenation catalyst, preferably a Mo—Ni and/or Mo—Co type diesel hydrogenation catalyst. The diesel hydrogenation catalyst includes a carrier and an active metal component supported on the carrier. The present invention has a wide selection range for the types of the carrier and the active metal component and the content of said carrier and active metal component. For example, the carrier, including but not limited to $\gamma$-$Al_2O_3$ and any $Al_2O_3$ modified with additives, etc., the active metal component includes at least one of VIB metals (preferably Mo and/or W) and at least one of Group VIII metals (preferably Ni and/or Co). Preferably, based on the total amount of the diesel hydrogenation catalyst, the content of said carrier is 60-80 wt %, and the content of the active metal component is 20-40 wt % in terms of oxides.

According to a preferred embodiment of the present invention, the diesel hydrogenation catalyst is FHUDS series hydrodesulfurization catalyst developed by the FRIPP, and further preferably FHUDS-6 and/or FHUDS-8 hydrodesulfurization catalyst with higher hydrodenitrogenation activity.

Preferably, based on the total volume of the catalyst filled in the fixed bed hydrogenation reactor, the volume ratio of the catalyst filled in the second hydrogenation reaction area is 1-80%, preferably 10-50%.

According to the present invention, preferably, the operating conditions of the second hydrogenation reaction area comprise: a pressure of 1.0-12.0 MPa, preferably 6.0-10.0 MPa, wherein the hydrogen partial pressure accounts for 50%-90% of the total pressure; a volume space velocity of 0.1-10.0 $h^{-1}$, preferably 2.0-6.0 $h^{-1}$; and a reaction temperature of 200-400° C., preferably 250-330° C.

Preferably, among the operating conditions of the second hydrogenation reaction area, the volume ratio of hydrogen to oil is 10:1-800:1, preferably 100:1-600:1.

In the preferred embodiment, the third hydrogenation reaction area is used for selective hydrogenation, saturation and ring-opening reactions of polycyclic aromatic hydrocarbons in the diesel fraction.

According to the present invention, the selection range of the catalyst filled in the third hydrogenation reaction area is wide, as long as the selective hydrogenation, saturation and ring-opening reaction of polycyclic aromatic hydrocarbons can be performed. Preferably, the third hydrogenation reaction area is filled with a diesel hydrogenation-upgrading catalyst. The diesel hydrogenation-upgrading catalyst includes a carrier and an active metal component supported on the carrier. The present invention has a wide selection range for the types of the carrier and the active metal component and the content of said carrier and active metal component. For example, the carrier, including but not limited to $\gamma\text{-}Al_2O_3$ and any $Al_2O_3$ modified with additives, etc., the active metal component includes at least one of VIB metals (preferably Mo and/or W) and at least one of Group VIII metals (preferably Ni and/or Co). Preferably, based on the total amount of the diesel hydrogenation-upgrading catalyst, the content of said carrier is 60-80 wt %, and the content of the active metal component is 20-40 wt % in terms of oxides.

According to a preferred embodiment of the present invention, the diesel hydrogenation-upgrading catalyst is the FC series special catalyst for hydrogenation-upgrading developed by the FRIPP, and further preferably, the FC-18 catalyst with higher saturation and ring-opening selectivity for aromatic hydrocarbons.

Preferably, based on the total volume of the catalyst filled in the fixed bed hydrogenation reactor, the volume ratio of the catalyst filled in the third hydrogenation reaction area is within a range of 1-80%, preferably 10-50%.

According to the present invention, preferably, the operating conditions of the third hydrogenation reaction area comprise: a pressure of 1.0-12.0 MPa, preferably 5.0-8.0 MPa; the third hydrogenation reaction area is a pure liquid-phase reaction area, the amount of dissolved hydrogen gas is within a range of 0.05-2.0 m %, preferably 0.1-1.5 m %; a volume space velocity of 0.1-8.0 $h^{-1}$, preferably 0.5-6.0 $h^{-1}$; a reaction temperature 200-400° C., preferably 320-380° C.

Since the ethylene cracking raw material with different fractions enter different types of cracking furnaces and carry out a steam cracking reaction, the specific embodiment of the method provided by the present invention realizes that the mixed oil of gasoline and diesel is used as the raw material, and the reaction types and conditions are controlled and the reaction depth and conversion rate are improved by partitioning in a fixed bed hydrogenation reactor. The mixed raw material of gasoline and diesel was respectively converted into naphtha fraction ethylene raw material with low content of sulfur, nitrogen and olefins and diesel fraction ethylene raw material with long side chain monocyclic aromatic hydrocarbons, thereby effectively increasing ethylene yield, reducing the content of aromatic hydrocarbons and extending the operation cycle of the device, while reducing investment amount and operating costs of the device. In the present invention, the hydrogen gas is introduced underneath the second hydrogenation reaction area, which not only helps to control the bed temperature of the first hydrogenation reaction area and the second hydrogenation reaction area, but also ensures a relatively high hydrogen partial pressure in the second hydrogenation reaction area. Such a reaction environment is beneficial to an occurrence of hydrodenitrogenation reaction in the second hydrogenation reaction area, and the second hydrogenation reaction area acts as the pre-refining area of the third hydrogenation reaction area, which can effectively avoid that the saturation reaction of aromatic hydrocarbons is influenced by the competitive adsorption of the nitrides on the hydrogenation-upgrading catalyst of the third hydrogenation reaction area, and avoid the poisoning and deactivation of the acidic catalyst, prolong the service life of said catalyst. In the meanwhile, the hydrogen gas can carry the reaction heat to the first hydrogenation reaction area at the upper side, which can effectively compensate for the temperature drop of the gas-liquid separation area caused by the gas-liquid separation process, and prevent the gas phase generated in the second hydrogenation reaction area from condensing and refluxing due to the temperature drop, and cause that the small molecular saturated hydrocarbons are enriched in the first hydrogenation reaction area, the yield of high quality naphtha fraction at the top of said reactor is increased. On the other hand, since the gas-phase light hydrocarbons flow upward through the first hydrogenation reaction area and are discharged outside, the liquid phase entering the third hydrogenation reaction area is almost free of small molecular hydrocarbons and hydrogen sulfide, which is beneficial to increase the solubility and/or dispersity of hydrogen gas in the liquid phase and further promote the hydro-upgrading reaction of the polycyclic aromatic hydrocarbons. In the third hydrogenation reaction area, the bicyclic aromatic hydrocarbons in the diesel fraction that have undergone gas-liquid separation, desulfurization and denitrogenation, carry out reaction to generate monocyclic aromatic hydrocarbons with C3-C4 side chains, which are used as the steam cracking raw material of the diesel fraction. Compared with the conventional hydrogenation diesel, the diesel fraction increases the chain alkane components that can be cracked, and reduces the content of bicyclic aromatic hydrocarbons that are easily coked by heating, and the properties are significantly optimized. In addition, the reaction area also has essential advantages such as stable liquid-phase hydrogenation reaction temperature, and the catalyst that is not limited by diffusion and has higher activity.

According to a preferred embodiment B of the present invention, the raw oil is a mixed raw material of inferior gasoline and diesel. The method provided by the present invention is used for simultaneously producing low-sulfur naphtha and low-sulfur diesel products.

In the preferred embodiment, the method includes: the fixed bed hydrogenation reactor comprise, arranged from top to bottom, a first hydrogenation reaction area, a gas-liquid separation area, a second hydrogenation reaction area and a third hydrogenation reaction area. The gas-liquid separation area is provided with a raw oil inlet. A hydrogen inlet is provided between the second hydrogenation reaction area and the third hydrogenation reaction area; In the gas-liquid separation area, the raw oil is separated into a gas phase A and a liquid phase A, wherein the gas phase A flows upward into the first hydrogenation reaction area, and the liquid phase A flows downward into the second hydrogenation reaction area; a hydrogenation catalyst bed is arranged in the second hydrogenation reaction area, the liquid phase A is in countercurrent contact with the hydrogen-containing gas phase between the second hydrogenation reaction area and the third hydrogenation reaction area, and carries out a hydrogenation reaction; the excess hydrogen gas continues to flow upward through the gas-liquid separation area and enters the first hydrogenation reaction area, the liquid-phase material flow dissolved with a part of hydrogen gas enters the third hydrogenation reaction area for further performing the deep hydrogenation reaction; a catalyst bed is arranged in the first hydrogenation reaction area, the excess hydrogen gas and the gas phase A are subjected to hydrodesulfurization, hydrodenitrogenation and olefin saturation reactions, the reactants can be further subjected to steam stripping or fractionating to obtain low-sulfur naphtha; a hydrogenation catalyst bed is disposed in the third hydrogenation reaction area, the liquid-phase material flow dissolved with a part of hydrogen gas is subjected to deep hydrodesulfurization and dearomatization reactions, and the reactant flowing out of the reactor is subjected to steam stripping to produce the low-sulfur and high quality diesel.

In the method provided by the present invention, the hydrogen gas is fully contacted with the material B, preferably, the hydrogen content in the material B reaches 80-150% of the saturated solubility.

A hydrogenation catalyst bed is arranged in the second hydrogenation reaction area, the liquid phase A is in countercurrent contact with the introduced low-temperature hydrogen gas to carry out a hydrogenation reaction, and perform heat transfer and mass exchange. Exothermic reactions such as hydrodesulfurization, hydrodenitrogenation and aromatics saturations mainly occur in second hydrogenation reaction area. The temperature in this area gradually increases along with the flow direction of the liquid phase A, but the reverse flow of low-temperature hydrogen gas reduces the temperature rise of the reaction area. The temperature rise of the second hydrogenation reaction area can be controlled by adjusting the flow rate of hydrogen gas, so that the temperature of said second hydrogenation reaction area is more uniform, which is beneficial to the control of hydrogenation reaction depth and the protection of catalyst activity and stability. The products generated by the reaction such as hydrogen sulfide, ammonia and small molecular hydrocarbons diffuse into the gas-phase material stream, and flow upward along with the gas phase and exit the second hydrogenation reaction area. When liquid phase A enters third hydrogenation reaction area, it basically does not contain small molecular hydrocarbons and hydrogen sulfide, etc., which is conducive to the dissolution and mixing of hydrogen gas, and promotes the deep hydrodesulfurization and other hydrogenation reactions of third hydrogenation reaction area.

The gas phase at the top of the second hydrogenation reaction area continues to flow upwards, passes through the gas-liquid separation area and mixes with the gas phase A and enters the first hydrogenation reaction area. A hydrogenation catalyst bed is disposed in the first reaction area, it is mainly used for reactions such as hydrodesulfurization, hydrodenitrogenation and olefin saturation reaction; the gas-phase reaction product flows out from the top of the fixed bed hydrogenation reactor, and the reaction effluent can be subjected to further steam stripping or fractionation to obtain the low-sulfur naphtha. The gas phase in the second hydrogenation reaction area carries a large amount of reaction heat, its temperature is higher than the temperature of the raw oil and gas phase A, which can promote the hydrogenation reaction, and compensate for the temperature drop of the gas-liquid separation area caused by the gas-liquid separation process, and prevent the gas phase generated by the second hydrogenation reaction area from condensing and refluxing due to the temperature reduction.

In the preferred embodiment, the hydrogen gas and the liquid phase A in step (2) are subjected to a hydrogenation reaction in the second hydrogenation reaction area to obtain a material B; the unreacted hydrogen gas and the gas phase A are subjected to hydrodesulfurization, hydrodenitrogenation and olefin saturation reactions in the first hydrogenation reaction area to obtain a material C; preferably, the method further includes subjecting the material C to steam stripping or fractionation in order to obtain a low-sulfur naphtha; the hydrogen-dissolved material B in step (3) downward enters the third hydrogenation reaction area for carrying out the deep hydrodesulfurization and dearomatization reactions to obtain a material D; preferably, the method further includes subjecting the material D to a steam stripping or fractionation to obtain a low-sulfur diesel.

According to the present invention, the mixed raw material of inferior gasoline and diesel refers to the straight-run gasoline and diesel blended with inferior secondary processing mixed raw material. The present invention does not specifically limit the blending ratio of inferior oil products. Preferably, among the mixed raw material of inferior gasoline and diesel, the gasoline fraction is one or more of the straight run fraction or the secondary processing gasoline, such as coking gasoline, catalytic cracking gasoline, catalytic cracking gasoline, thermal cracking gasoline and other secondary processing gasoline; the distillation range of the gasoline fraction is 30-200° C.; the diesel fraction is one or more of the straight run diesel or the secondary processing diesel, such as catalytic cracking diesel, coking diesel, fluidized bed residue hydrogenation diesel and other secondary processing diesel, the distillation range of the diesel fraction is 160-380° C.

In the present invention, the mass ratio of gasoline fraction and diesel fraction in the mixed raw material of gasoline and diesel is arbitrary, preferably 1:10-10:1.

According to the present invention, in the mixed raw material of inferior gasoline and diesel, the content of S is not larger than 20,000 g/g, the content of N is not larger than 3,000 g/g, and the content of polycyclic aromatic hydrocarbons is not larger than 30 wt %.

In this preferred embodiment, each of the catalyst beds can be filled with one or more catalysts in a gradation configuration.

According to the present invention, preferably, the volume ratio of total hydrogen to oil in the fixed bed hydrogenation reactor is 10:1-800:1, more preferably 100:1-600:1.

In the preferred embodiment, preferably, based on the total amount of catalyst in the fixed bed hydrogenation reactor, the volume ratio of catalyst filled in the first hydrogenation reaction area is 1-60%, preferably 5-40%; the volume ratio of catalyst filled in the second hydrogenation reaction area is 10-90%, preferably 5-60%; the volume ratio of catalyst filled in the third hydrogenation reaction area is 1-70%, preferably 5-50%.

Preferably, the first hydrogenation reaction area can be filled with the conventional hydrodesulfurization catalyst, and the specific selection range can be the same as or different from the light distillate oil hydrogenation catalysts filled in the first hydrogenation reaction area described in the preferred embodiment A, the content will be repeatedly described herein. Preferably, the first hydrogenation reaction area can be filled with FH-40 series special catalysts for light distillate oil hydrogenation developed by the FRIPP, and further preferably, the FH-40B catalyst with higher desulfurization activity may be selected.

According to a preferred embodiment of the present invention, the operating conditions of the first hydrogenation reaction area comprise: a pressure of 1.0-8.0 MPa, preferably 2.0-4.0 MPa; wherein the hydrogen partial pressure accounts for 30%-80% of the total pressure; a volume space velocity of 0.1-10.0 $h^{-1}$, preferably 2.0-6.0 $h^{-1}$; and a reaction temperature of 200-380° C., preferably 260-360° C. Preferably, among the operating conditions of the first hydrogenation reaction area, the volume ratio of hydrogen to oil is 10:1-800:1, more preferably 100:1-600:1.

In the preferred embodiment, preferably, the operating conditions of the gas-liquid separation area comprise: the feed temperature is 150-380° C., more preferably 260-310° C.

In the preferred embodiment, the second hydrogenation reaction area can be filled with the light distillate oil hydrogenation catalyst filled in the first hydrogenation reaction area, or a diesel fraction hydrodesulfurization catalyst, or a mixture thereof. The specific selection range of the diesel fraction hydrodesulfurization catalyst may be the same as or different from the diesel hydrogenation catalyst filled in the second hydrogenation reaction area described in the preferred embodiment A, the content will not be repeatedly described herein. Preferably, the second hydrogenation reaction area may be filled with FHUDS series hydrodesulfurization catalyst developed by the FRIPP. Further preferably, the second hydrogenation reaction area is filled with at least one of FHUDS-5, FHUDS-6 and FHUDS-7 catalysts with high desulfurization activity.

According to the present invention, preferably, the operating conditions of the second hydrogenation reaction area comprise: a pressure of 2.0-10.0 MPa, more preferably 6.0-9.0 MPa, wherein the hydrogen partial pressure accounts for 50%-90% of the total pressure; a volume space velocity of 0.1-5.0 $h^{-1}$, more preferably 1-3.0 $h^{-1}$; and a reaction temperature of 220-420° C., more preferably 300-380° C. Preferably, among the operating conditions of the second hydrogenation reaction area, the volume ratio of hydrogen to oil is 10:1-800:1, more preferably 100:1-600:1.

In the preferred embodiment, a hydrogenation catalyst bed is arranged in the third hydrogenation reaction area, and the liquid-phase material dissolved with hydrogen gas is subjected to deep hydrodesulfurization and dearomatization reactions. Usually, the reaction heat release is not large, the reaction temperature is uniform, and the reactant flows out of the reactor and is subjected to stream stripping to obtain a low-sulfur diesel.

According to the present invention, the selection range of catalysts filled in the third hydrogenation reaction area is wide, as long as the liquid-phase material flow can be subjected to deeply hydrodesulfurization and dearomatization reactions. Preferably, the third hydrogenation reaction area is filled with the light distillate hydrogenation catalyst filled in the first hydrogenation reaction area and/or the catalyst filled in the second hydrogenation reaction area.

According to the present invention, preferably, the operating conditions of the third hydrogenation reaction area comprise: a pressure of 2.0-10.0 MPa, more preferably 6.0-9.0 MPa; the third hydrogenation reaction area is a pure liquid-phase reaction area, the amount of dissolved hydrogen gas is within a range of 0.1-3.0 m %, more preferably 0.5-1.5 m %; a volume space velocity of 0.1-8.0 $h^{-1}$, more preferably 0.5-6.0 $h^{-1}$; a reaction temperature of 220-420° C., more preferably 280-360° C.

Preferably, in order to ensure that the second hydrogenation reaction area maintains a high deep desulfurization activity, the bed temperature of the second hydrogenation reaction area should be controlled to be 5-30° C. higher than that of the gas-liquid separation area.

Preferably, in order to control that the third hydrogenation reaction area has enough hydrogen gas to participate in the deep hydrodenitrogenation and dearomatization reactions, a mixed hydrogen-dissolving component or equipment is preferably provided between the second hydrogenation reaction area and the third hydrogenation reaction area, and the mixed hydrogen-dissolving component or equipment is used for improving solubility and/or dispersity of hydrogen gas in said material B; mixed hydrogen-dissolving component or equipment is as described above, and will not be repeated here.

At present, the gasoline and diesel hydrogenation unit adopts the conventional trickle bed hydrogenation technology, the hydrogen gas enters the reactor from the top of said reactor, and completes the whole reaction in the reactor, so that the refined diesel or ungasified gasoline is used as the ingredients for blending the refined diesel; the hydrogenated naphtha is affected by the content of hydrogen sulfide in the system and the gas-liquid-solid three-phase reaction performance, the refined oil contains a small amount of sulfide, the refined oil cannot be used as a reforming feed, but can only be used as a reforming pre-hydrogenation feed. In this way, two hydrogenation processes are required to produce qualified products, such that the energy consumption for producing qualified products is increased. In the existing patent application documents for gas-liquid countercurrent technology, when gasoline and diesel are treated, unhydrogenated naphtha affects product quality. In addition, a large hydrogen-oil ratio is required at the bottom, which is prone to cause displacement of the catalyst in the reactor and affect integrity of the bed. The above-mentioned embodiment of the present invention subtly combines the feed positions of the raw material (raw oil and hydrogen gas) with the four areas artificially disposed, and organically decomposes and integrates the hydrodesulfurization process, which greatly reduces the gas-liquid countercurrent contact area (in the present invention, only the second hydrogenation reaction area is the gas-liquid countercurrent contact area), and prevents flooding phenomenon without affecting the desulfurization effect. The $H_2S$, $NH_3$ and light gas-phase fractions produced by the reaction all flow out from the top of the fixed bed hydrogenation reactor. The first hydrogenation reaction area has no liquid phase reflux, and avoids the defect in the traditional gas-liquid countercurrent device that the gas-liquid flow resistance is increased due to that the gas-phase light hydrocarbons need to flow back to the bottom of the reactor and discharged from the device. The second hydrogenation reaction area is an area where the reaction is relatively violent, and accompanied with a lot of heat release. The hydrogen gas with a lower temperature is introduced from a lower part of the second hydrogenation reaction area, and can carry a large amount of reaction heat to the gas-phase co-current reaction area (i.e., the first hydrogenation reaction area) in the upper gas phase, effectively compensate for the temperature drop in the gas-liquid separation area caused by the gas-liquid separation process, prevent the gas phase generated in the second hydrogenation reaction area from condensing and refluxing due to the temperature drop, and maintain the temperature of the first hydrogenation reaction area and the second hydrogenation reaction area at a stable level, and achieve the efficient utilization of thermal energy. The effluent material from the second hydrogenation reaction area is dissolved with a certain amount of hydrogen gas and enters the third hydrogenation reaction area to carry out a liquid phase hydrogenation reaction. The material is subjected to heat exchange with hydrogen gas in the second hydrogenation reaction area, the material entering the third hydrogenation reaction area has a slightly reduced temperature. At the same time, the upper part of the third hydrogenation reaction area is the hydrogen inlet, where the hydrogen partial pressure is the highest, and the reaction area is not affected by light hydrocarbons, the solubility of hydrogen gas is also very high. The low temperature and high pressure reaction environment is more suitable for the deep hydrogenation and saturation reaction of aromatic hydrocarbons. In addition, the reaction area also has the essential advantages of stable liquid-phase hydrogenation reaction temperature and higher activity of the catalyst because it is not limited by diffusion. The present invention can utilize a fixed bed hydrogenation reactor to process the mixed raw material of inferior gasoline and diesel, and simultaneously produce naphtha with a sulfur content less than 0.5 g/g and diesel products with a sulfur content less than 10 g/g.

According to a preferred embodiment C of the present invention, the raw oil is the aviation kerosene raw material with cut weight fraction. The method provided by the present invention can be used for producing high quality aviation kerosene products with a low freezing point and a high smoke point by using the aviation kerosene raw material with cut weight fraction having a high freezing point, a low smoke point and high nitrogen content as raw material under the conditions of simple process and low energy consumption.

In this preferred embodiment, the hydrogen gas and the liquid phase A in step (2) are subjected to deep hydrodenitrogenation and aromatic hydrocarbon saturation reactions in the second hydrogenation reaction area to obtain a material B; The material B downward enters the third hydrogenation reaction area for carrying out isomerization and supplementary refining reactions to obtain a material D; The unreacted hydrogen gas and the gas phase A are subjected to a hydrodethiol reaction in the first hydrogenation reaction area to obtain a material C; Wherein the material C and the material D are blended to obtain a high quality aviation kerosene products with a low freezing point and a high smoke point. Specifically, the method includes: the fixed bed hydrogenation reactor comprise, arranged from top to bottom, a first hydrogenation reaction area a gas-liquid separation area, a second hydrogenation reaction area and a third hydrogenation reaction area. The gas-liquid separation area is provided with a raw oil inlet. A hydrogen inlet is provided between the second hydrogenation reaction area and the third hydrogenation reaction area; the aviation kerosene raw material with cut weight fraction enters the gas-liquid separation area from the raw oil inlet, and is subjected to a gas-liquid separation and separated into a light aviation kerosene fractions and a heavy aviation kerosene fraction, wherein the light aviation kerosene fraction flows upward into the first hydrogenation reaction area, the heavy aviation kerosene flows downward into the second hydrogenation reaction area, the hydrogen gas is introduced from a hydrogen inlet arranged between the second hydrogenation reaction area and the third hydrogenation reaction area; the hydrogen gas flows upwards and carries out deep hydrodenitrogenation and aromatic hydrocarbon saturation reaction in the second hydrogenation reaction area with the heavy aviation kerosene fraction, and the reacted material goes down into the third hydrogenation reaction area for performing the isomerization and supplementary refining reaction to obtain a material D; the unreacted hydrogen gas continues to flow upward through the gas-liquid separation area and enters the first hydrogenation reaction area, and subjects to a hydrodethiol reaction with the light aviation kerosene fraction to obtain a material C, the material D is blended with the material C to produce the high quality aviation kerosene products with a low freezing point and a high smoke point.

The aviation kerosene with cut weight fraction of the present invention has the characteristics of a high freezing point, a low smoke point and a high nitrogen content. In the reaction method of the present invention, the aviation kerosene fraction with cut weight fraction preferably has a distillation 120-320° C., a freezing point not larger than −10° C., such as generally −20° C. to −45° C., and a smoke point not lower than 10 mm, such as generally 10-20 mm.

The gas-liquid separation area is used for performing gas-liquid separation of the aviation kerosene with cut weight fraction, preferably, the gas-liquid separation area is used to separate the light aviation kerosene fraction below 260° C. from the raw material, the light aviation kerosene fraction enters a first hydrogenation reaction area as the gas phase A, and the heavy aviation kerosene fraction above 260° C. enters a second hydrogenation reaction area as the liquid phase A.

The conditions for the gas-liquid separation are not particularly limited, as long as the above-mentioned objects can be achieved.

Preferably, the operating conditions of the gas-liquid separation area comprise: a feed temperature of 200-300° C., preferably 240-280° C.

According to the present invention, preferably, the volume ratio of total hydrogen to oil in the fixed bed hydrogenation reactor is 10:1-800:1, preferably 100:1-600:1.

In the reaction method of the present invention, preferably, the first hydrogenation reaction area is used for performing the dethiol reaction of the light aviation kerosene fraction. In a preferred circumstance, the first hydrogenation reaction area may be filled with a conventional hydrodethiol catalyst, the present invention does not impose particular limitation on the hydrodethiol catalyst, as long as the removal of thiol in the gas phase A is removed. Preferably, the first hydrogenation reaction area is filled with a light distillate oil hydrogenation catalyst. The specific selection range may be the same as or different from the light distillate oil hydrogenation catalyst filled in the first hydrogenation reaction area described in the preferred embodiment A, the content will not be repeatedly described herein. Preferably, the first hydrogenation reaction area may be filled with FH-40 series light distillate oil hydrogenation special catalyst developed by the FRIPP, and further preferably, the FH-40C catalysts commonly used in aviation kerosene refining may be selected.

Preferably, based on the total filling amount of catalyst in the fixed bed hydrogenation reactor, the volume ratio of catalyst filled in the first hydrogenation reaction area is 1-60%, preferably 5-40%.

According to a preferred embodiment of the present invention, the operating conditions of the first hydrogenation reaction area comprise: a pressure of 1.0-8.0 MPa, more preferably 2.0-6.0 MPa, wherein the hydrogen partial pressure accounts for 40%-80% of the total pressure; a volume space velocity of 0.1-10.0 $h^{-1}$, more preferably 0.5-6.0 $h^{-1}$; and a reaction temperature of 150-280° C., more preferably 200-260° C. Preferably, among the operating conditions of the first hydrogenation reaction area, the volume ratio of hydrogen to oil is 10:1-800:1, preferably 100:1-400:1.

In the reaction method of the present invention, the second hydrogenation reaction area is used for deep denitrogenation and aromatic hydrocarbon saturation reaction of heavy aviation kerosene fraction. Preferably, the second hydrogenation reaction area is filled with a diesel hydrogenation catalyst, more preferably a Mo—Ni and/or Mo—Co type diesel hydrogenation catalyst. The specific selection range of the diesel hydrogenation catalyst may be the same as or different from the diesel hydrogenation catalyst filled in the second hydrogenation reaction area described in the preferred embodiment A, the content will not be repeated here. Preferably, the second hydrogenation reaction area may be filled with FHUDS series hydrodesulfurization catalyst developed by the FRIPP. Further preferably, the second hydrogenation reaction area is filled with FHUDS-6 and/or FHUDS-8 catalysts with higher hydrodenitrogenation and dearomatization activities.

Preferably, based on the total filling amount of catalysts in the fixed bed hydrogenation reactor, the volume ratio of catalyst filled in the second hydrogenation reaction area is 1-80%, preferably 10-50%.

According to the present invention, preferably, the operating conditions of the second hydrogenation reaction area comprise: a pressure of 1.0-8.0 MPa, more preferably 2.0-6.0 MPa, wherein the hydrogen partial pressure accounts for 50%-90% of the total pressure; a volume space velocity of 0.1-10.0 $h^{-1}$, more preferably 1.0-5.0 $h^{-1}$; and a reaction temperature of 200-380° C., more preferably 220-320° C. Preferably, among the operating conditions of the second hydrogenation reaction area, the volume ratio of hydrogen to oil is 10:1-800:1, preferably 100:1-400:1.

In this preferred embodiment, the third hydrogenation reaction area is used for isomerization and supplementary refining reactions of the heavy aviation kerosene fraction. Preferably, the third hydrogenation reaction area is filled with an isomerization catalyst and a refining catalyst. Preferably, the isomerization catalyst may be an existing lubricating oil isomerization dewaxing catalyst, or may be the catalyst for reducing freezing point of the aviation kerosene described in CN "201711025956.7". The refining catalyst may be a conventional hydrorefining catalyst, such as the FH-40 series special catalysts for light distillate oil hydrogenation developed by the FRIPP as described above, and further preferably, the FH-40D catalyst with higher hydrogenation activity.

Preferably, based on the total filling amount of catalyst in the fixed bed hydrogenation reactor, the volume ratio of catalyst filled in the third hydrogenation reaction area is 1-80%, preferably 20-60%.

Preferably, the volume ratio of the isomerization catalyst and the refining catalyst is 1:1-5:1.

Preferably, the operating conditions of the third hydrogenation reaction area comprise: a pressure of 1.0-8.0 MPa, preferably 2.0-6.0 MPa; the third hydrogenation reaction area is a pure liquid-phase reaction area, and the amount of dissolved hydrogen gas is 0.1-3.0 m %, more preferably 0.5-1.0 m %; a volume space velocity of 0.1-8.0 $h^{-1}$, preferably 0.5-6.0 $h^{-1}$; a reaction temperature of 200-400° C., more preferably 220-360° C.

Taking FIG. 2 as an example to illustrate the execution process of the reaction method in embodiment C of the present invention: the reaction raw material 1 enters the gas-liquid separation area 4 under certain temperature and pressure conditions, and the liquid phase flows downward into the second hydrogenation reaction area 5. The hydrogen gas enters the reactor via a hydrogen inlet 2 arranged between the second hydrogenation reaction area 5 and the third hydrogenation reaction area 6; after mixing and contacting with the liquid material flowing downward in the second hydrogenation reaction area 5, the excess hydrogen gas continues to flow upward into the second hydrogenation reaction area 5, while the liquid phase dissolving and carrying the hydrogen gas flows downward and enters the third hydrogenation reaction area 6. The gas phase reaction is carried out in the first hydrogenation reaction area 3, the light aviation kerosene fraction is subjected to the desulfurization reaction and discharged via the light fraction discharge pipeline 9. The gas phase and liquid phase reactions are carried out in the second hydrogenation reaction area 5, wherein the liquid phase is the heavy aviation kerosene fraction flowing downward, the gas phase is hydrogen gas flowing upward; the gas-liquid reverse contact causes the deep denitrogenation and aromatic hydrocarbons saturation reactions. The hydrogen sulfide and small molecular hydrocarbons generated by the reactions flow upward along with the gas phase material into the first hydrogenation reaction area 3, and then flow out of the device from the top of said reactor. The hydrogenated liquid phase material flows down into the third hydrogenation reaction area 6. The liquid phase isomerization and supplementary refining reactions are performed in the third hydrogenation reaction area 6, the heavy fraction is discharged from the heavy fraction discharge pipeline 10. The fraction discharged from the light fraction discharge pipeline 9 and the fraction discharged from the heavy fraction discharge pipeline 10 are blended to produce an aviation kerosene products 11 with a low freezing point and a high smoke point.

Compared with the conventional hydrorefining technology for producing aviation kerosene, the aforementioned reaction method (preferred embodiment C) provided by the present invention can widen the distillation range of the aviation kerosene raw material, produce high quality aviation kerosene products by using the aviation kerosene fraction with cut weight fraction, and reduce production of diesel and increase the production of aviation kerosene; compared with the existing technology to reduce the freezing point of aviation kerosene, the present invention optimizes the process flow and the form of said reactor, preferably only performing the isomerization and deep hydrogenation reaction in regard to the separated heavy fraction having a distillation range above 260° C. and really affecting the freezing point and smoke point of aviation kerosene, thereby avoiding the influence on catalyst life by the isomerization and hydrogenation reaction in regard to the whole distillate. In addition, the present invention can greatly reduce the amounts of steam stripping, heat exchange and other devices disposed between the reactors required by the different reactors for carrying out the separate reactions, and avoid energy waste caused by repeated product separation and other processes. The second hydrogenation reaction area is an area where the reaction is relatively violent, and accompanied with a lot of heat release. The hydrogen gas is introduced from a lower part of the second hydrogenation reaction area, and can carry a large amount of reaction heat to the first hydrogenation reaction area in the upper gas phase, effectively compensate for the temperature drop in the gas-liquid separation area caused by the gas-liquid separation process, prevent the gas phase generated in the second hydrogenation reaction area from condensing and refluxing due to the temperature drop, and maintain the temperature of the first hydrogenation reaction area and the second hydrogenation reaction area at a stable level, and achieve the efficient utilization of thermal energy. At the same time, the feeding position of hydrogen gas is not only conducive to controlling the bed temperature of the second hydrogenation reaction area, but also causes a relatively high hydrogen partial pressure of the second hydrogenation reaction area. Such a reaction environment is conducive to the occurrence of the hydrogenation reaction of aromatic hydrocarbons, and significantly improves the smoke point of the aviation kerosene products. Since the hydrogen sulfide, ammonia and other substance generated in the reaction process that affect the deep hydrodesulfurization reaction, flow upwards along with the gas phase, and will not enter the third hydrogenation reaction with the liquid phase material, and the third hydrogenation reaction area is not affected by light hydrocarbons; in addition, the third hydrogenation reaction area is not influenced by the light hydrocarbons, the solubility of hydrogen gas is also very high, and the environment of high hydrogen pressure can promote the isomerization and supplementary refining reactions of the third hydrogenation reaction area. Moreover, the reaction area also has the essential advantages of stable liquid-phase hydrogenation reaction temperature and higher activity of the catalyst because it is not limited by diffusion.

The present invention will be described in detail below with reference to examples.

Examples A1-A3

The example used a 100 mL (filling amount of the catalyst) fixed bed hydrogenation reactor, as shown in FIG. 1, the fixed bed hydrogenation reactor comprise, arranged from top to bottom, a first hydrogenation reaction area, a gas-liquid separation area, a second hydrogenation reaction area and a third hydrogenation reaction area. A hydrogen inlet is provided between the second hydrogenation reaction area and the third hydrogenation reaction area; a catalyst bed was arranged for each of the first hydrogenation reaction area, the second hydrogenation reaction area and the third hydrogenation reaction area disposed from top to bottom. The first hydrogenation reaction area was filled with the Ni—Mo type hydrorefining catalyst A, the second hydrogenation reaction area was filled with the Ni—Mo type hydrorefining catalyst B, and the third hydrogenation reaction area was filled with the Ni—W hydrogenation-upgrading catalyst C. The catalysts were filled according to the volume ratio of catalyst A:catalyst B:catalyst C=10:40:50 based on the reactor volume. The mixed oil of straight-run diesel and coking gasoline and diesel was used as the raw oil, and the ratio of straight-run diesel:coking gasoline:coking diesel was 30:30:40. The raw oil was subjected to a gas-liquid separation in the gas-liquid separation area and separated into naphtha fraction and diesel fraction, wherein the naphtha fraction flowed upward into the first hydrogenation reaction area, and the diesel fraction flowed downward into the second hydrogenation reaction area. The hydrogen gas was introduced via a hydrogen inlet arranged between the second hydrogenation reaction area and the third hydrogenation reaction area; the hydrogen gas flowed upwards and was subjected to the deep hydrodesulfurization and denitrogenation reactions in the second hydrogenation reaction area with diesel fraction, the reacted material went down into the third hydrogenation reaction area to carry out the selective hydrogenation saturation and ring-opening reactions of polycyclic aromatic hydrocarbons, the obtain material D was the ethylene cracking raw material of the diesel fraction; the unreacted hydrogen gas continued to flow upward and pass through the gas-liquid separation area and entered the first hydrogenation reaction area, and carried out the hydrodesulfurization and denitrogenation and olefin saturation reactions with the naphtha fraction, the obtained material C was the ethylene cracking raw material of naphtha fraction.

The catalyst properties were shown in Table A1, the properties of raw oil were shown in Table A2, the reaction process conditions and results were shown in Table A3.

Comparative Example A1

The conventional fixed bed diesel hydrogenation technology was used, the raw materials were introduced into a 100 mL fixed bed hydrogenation reactor and then entered the fractionation tower to obtain the hydrogenated naphtha fraction and diesel fraction. The raw material were the same as the above-mentioned embodiments, and the Ni—Mo type hydrorefining catalyst B was filled, and the filling volume was equal to the sum of the three catalysts A, B, and C in the Example A1, and the total volumetric space velocity was the same as that of the Examples.

Comparative Example A2

The conventional MCI (diesel hydrogenation-upgrading) technology was used, the raw materials were introduced into a 100 mL fixed-bed hydrogenation-upgrading reactor and then entered into a fractionation tower to obtain the hydro-upgraded naphtha fraction and diesel fraction. The properties of the raw material were the same as those of the above-mentioned examples, the Ni—Mo type pretreatment catalyst D and the catalyst C in the third hydrogenation reaction area in the above-mentioned examples were filled in gradation configuration, and the filling volume was equal to the sum of the three catalysts A, B, and C in the Example A1, and the filling volume ratio of the catalyst D relative to the catalyst C was 1:1.

The total volumetric space velocity was the same as that of the Examples.

TABLE A1

Physicochemical properties of the catalysts

| No. | A | B | C | D |
|---|---|---|---|---|
| Active metal | Ni—Mo | Ni—Mo | Ni—W | Ni—Mo |
| Metal oxide content, m % | 23 | 30 | 28 | 28 |
| Mass ratio of oxidation state main metal (Mo, W) and auxiliary (Ni, Co) oxide | 3:1 | 5:1 | 3:1 | 6:1 |
| Carrier type | $\gamma$-$Al_2O_3$ | $\gamma$-$Al_2O_3$ | Y molecular sieve | $\gamma$-$Al_2O_3$ |
| Shape | Clover | Clover | Clover | Clover |
| Diameter, mm | 2.0 | 1.2 | 1.3 | 1.3 |
| Specific surface area, $m^2 \cdot g^{-1}$ | 220 | 220 | 180 | 180 |
| Pore volume, $mL \cdot g^{-1}$ | 0.45 | 0.28 | 0.30 | 0.32 |

TABLE A2

Properties of raw oil

| Oil properties | |
|---|---|
| Density (20° C.), $g \cdot cm^{-3}$ | 0.84 |
| Distillation range, ° C. | 45-362 |
| S, $\mu g \cdot g^{-1}$ | 11439 |
| N, $\mu g \cdot g^{-1}$ | 270 |
| Aromatic hydrocarbons, m % | 19.2 |
| Polycyclic aromatic hydrocarbons, m % | 9.0 |
| Monocyclic aromatic hydrocarbons, m % | 10.2 |

TABLE A3

Hydrogenation process conditions and results

| | Example A1 | Example A2 | Example A3 | Comparative Example A1 | Comparative Example A2 |
|---|---|---|---|---|---|
| Hydrogen partial pressure, MPa | | | | | |
| Inlet | 7.5 | 8.0 | 8.0 | 6.0 | 6.5 |
| First hydrogenation reaction area | 3.5 | 4.0 | 4.0 | | |
| Second hydrogenation reaction area | 6.5 | 7.0 | 7.0 | | |
| Third hydrogenation reaction area | 6.0 | 6.5 | 6.5 | | |
| Volume space velocity, $h^{-1}$ | | | | | |
| First hydrogenation reaction area | 6 | 6 | 6.5 | 2 | 2 |
| Second hydrogenation reaction area | 4 | 3 | 3 | | |
| Third hydrogenation reaction area | 3 | 3 | 2.5 | | |
| Ratio of total hydrogen to oil, v/v | 400 | 400 | 400 | 400 | 400 |
| The amount of dissolved hydrogen in the third hydrogenation reaction area, m % | 0.5 | 0.5 | 0.5 | | |
| Reaction temperature, °C | | | | | |
| First hydrogenation reaction area | 240 | 245 | 250 | 310 | 345 |
| Gas-liquid separation area | 245 | 250 | 260 | | |
| Second hydrogenation reaction area | 295 | 305 | 310 | | |
| Third hydrogenation reaction area | 325 | 335 | 345 | | |
| Sulfur content in naphtha, µg/g | 0.5 | 0.4 | 0.4 | 0.5 | 0.5 |
| Nitrogen content in naphtha, µg/g | 0.4 | 0.3 | 0.2 | 0.3 | 0.2 |
| Olefin content in naphtha, % | 2.0 | 1.6 | 1.3 | 1.3 | 1.2 |
| Sulfur content in diesel, µg/g | 10 | 8 | 6 | 23 | 5 |
| Nitrogen content in diesel, µg/g | 2 | 2 | 1 | 7 | 0.8 |
| Content of monocyclic aromatic hydrocarbons in diesel, m % | 14.3 | 15.2 | 18.0 | 9.5 | 10.3 |
| Content of polycyclic aromatic hydrocarbons in diesel, m % | 1.5 | 1.2 | 1.0 | 8.3 | 4.2 |

As can be seen from Table A3, compared with the conventional fixed-bed hydrogenation process, the method in the present invention can use the mixed oil of gasoline and diesel as the raw material, and simultaneously produce the high quality naphtha fraction ethylene cracking raw material and diesel fraction ethylene cracking raw material, wherein diesel fraction has a higher content of monocyclic aromatic hydrocarbons which are suitable for producing olefins through cracking.

Compared with the MCI hydrogenation-upgrading technology, the present invention merely carries out hydrogenation-upgrading for the diesel fraction having a requirement for conversion into the polycyclic aromatic hydrocarbons due to the area-controlled reaction type and conditions, thus the conversion rate of polycyclic aromatic hydrocarbons is higher.

Examples B1-B3

A fixed bed hydrogenation reactor with a total catalyst filling volume of 100 ml was used in the examples, as shown in FIG. 1, the fixed bed hydrogenation reactor comprise, arranged from top to bottom, a first hydrogenation reaction area a gas-liquid separation area, a second hydrogenation reaction area and a third hydrogenation reaction area. A hydrogen inlet is provided between the second hydrogenation reaction area and the third hydrogenation reaction area; a catalyst bed was arranged for each of the first hydrogenation reaction area, the second hydrogenation reaction area and the third hydrogenation reaction area disposed from top to bottom. The first hydrogenation reaction area was filled with the Co—Mo type hydrorefining catalyst A, the second hydrogenation reaction area was filled with the Co—Mo type hydrorefining catalyst B, and the third hydrogenation reaction area was filled with the Ni—Mo hydrogenation-upgrading catalyst C. The catalysts were filled according to the volume ratio of 15:50:35, the specific details were shown in Table B3. The mixed oil of catalytic gasoline and blended diesel was used as the raw oil, and the ratio of catalytic gasoline:straight-run diesel:coking diesel was 30:30:40. The raw oil was introduced via a gas-liquid separation area, and hydrogen gas was introduced through a hydrogen inlet arranged between the second hydrogenation reaction area and the third hydrogenation reaction area; the raw oil was separated in the gas-liquid separation area into a gas phase A and a liquid phase A, wherein the gas phase A flowed upward into the first hydrogenation reaction area, and the liquid phase A flowed downward into the second hydrogenation reaction area; the liquid phase A was in countercurrent contact with the hydrogen-containing gas phase between the second hydrogenation reaction area and the third hydrogenation reaction area, and carried out a hydrogenation reaction to obtain a material B; the excess hydrogen continued to flow upward through the gas-liquid separation area into the first hydrogenation reaction area, and the material B dissolved with a part of the hydrogen gas entered the third hydrogenation reaction area to further perform the deep hydrogenation reaction; the excess hydrogen gas and the gas phase A carried out the hydrodesulfurization, hydrodenitrogenation and olefin saturation reactions in the first hydrogenation reaction area. A high-efficiency hydrogen mixer was arranged between the second hydrogenation reaction area and the third hydrogenation reaction area, such that the hydrogen content in the material B reaches 130% of the saturated solubility. During the reaction process, the bed temperature was stable and controllable, the effluent material at the top of the reactor was subjected to steam stripping to obtain the ultra-low sulfur naphtha fraction, and the material discharged from the bottom of said reactor was subjected to steam stripping to obtain ultra-low sulfur diesel fraction. After the shutdown, the catalyst bed was observed to be flat and smooth, and no serious disturbance occurred. The catalyst properties were shown in Table B1, the properties of raw oil were shown in Table B2, the reaction process conditions and results were shown in Table B3.

Comparative Example B1

The gas-liquid countercurrent reactor and the liquid-phase hydrogenation reactor were used and connected in series, catalysts A and B were filled in the gas-liquid countercurrent reactor, and catalyst C was filled in the co-current reactor, the filling volume and the ratio of three catalysts were the same as that in the Examples B1-B3. The total volumetric space velocity was the same as that in the Examples.

The raw oil was introduced from the top of the gas-liquid countercurrent reactor, the hydrogen gas entered from the bottom of said gas-liquid countercurrent reactor, the product flowing out of the gas-liquid countercurrent reactor directly entered the liquid-phase hydrogenation reactor without further subjecting to mixing with the hydrogen gas. Finally, the raw oil entered a stripping tower and a fractionating tower to obtain naphtha and diesel products. During the reaction process, the flow rate of hydrogen gas in the gas-liquid countercurrent reactor was not easily and stably controlled, and the reaction temperature fluctuated. After the shutdown, the catalyst bed was observed to be disturbed, each catalyst bed was back-mixed with the filled ceramic balls to a certain extent.

Comparative Example B2

A gas-liquid countercurrent hydrogenation reactor was used, three catalyst beds were disposed in the reactor from top to bottom and sequentially filled with the aforementioned catalysts A, B and C, the filling volume and the ratio of three catalysts were the same as those of Examples B1-B3. The total volumetric space velocity was the same as that in the Examples. The raw oil was introduced from the top of said reactor, and the hydrogen gas entered from the bottom of said reactor. The refined oil flowed out from the bottom of said reactor and then entered the stripping tower and fractionating tower to obtain naphtha and diesel products. During the operation process, the pressure at the top of said reactor was unstable, the gas flow fluctuated violently, and the liquid phase product flowed out of the bottom of said reactor in a pulsed manner. After the shutdown, the catalyst bed was observed to be disturbed, each catalyst bed was back-mixed with the filled ceramic balls to a certain extent.

TABLE B1

| Physicochemical properties of catalysts | | | |
|---|---|---|---|
| No. | A | B | C |
| Active metal | Co—Mo | Co—Mo | Ni—Mo |
| Metal oxide content, m % | 20 | 28 | 30 |
| Mass ratio of oxidation state main metal (Mo, W) and auxiliary (Ni, Co) oxide | 4:1 | 6:1 | 5:1 |
| Carrier type | $\gamma$-$Al_2O_3$ | $\gamma$-$Al_2O_3$ | $\gamma$-$Al_2O_3$ |
| Shape | Clover | Clover | Clover |
| Diameter, mm | 2.0 | 2.0 | 1.2 |
| Specific surface area, $m^2 \cdot g^{-1}$ | 220 | 230 | 180 |
| Pore volume, $mL \cdot g^{-1}$ | 0.5 | 0.35 | 0.35 |

TABLE B2

| Properties of raw oil | | | |
|---|---|---|---|
| Oil properties | Catalytic gasoline | Mixed diesel | Mixed raw material |
| Density (20° C.), $g \cdot cm^{-3}$ | 0.72 | 0.85 | 0.84 |
| Distillation range, ° C. | 50-195 | 165-375 | 50-375 |
| S, $\mu g \cdot g^{-1}$ | 180 | 12595 | 12000 |
| N, $\mu g \cdot g^{-1}$ | 37 | 477 | 450 |
| Aromatic hydrocarbons, v % | 22 | 33 | 32 |

TABLE B3

| Hydrogenation process conditions and results | | | | | |
|---|---|---|---|---|---|
| | Example B1 | Example B2 | Example B3 | Comparative Example B1 | Comparative Example B2 |
| Hydrogen partial pressure, MPa | | | | | |
| Inlet | 7.5 | 8.0 | 8.0 | 6.0 | 6.5 |
| First hydrogenation reaction area | 2.5 | 3.0 | 3.0 | | |

TABLE B3-continued

Hydrogenation process conditions and results

| | Example B1 | Example B2 | Example B3 | Comparative Example B1 | Comparative Example B2 |
|---|---|---|---|---|---|
| Second hydrogenation reaction area | 6.5 | 7.0 | 7.0 | | |
| Third hydrogenation reaction area | 6.0 | 6.5 | 6.5 | | |
| Volume space velocity, $h^{-1}$ | | | | | |
| First hydrogenation reaction area | 2 | 2 | 2 | 1 | 1 |
| Second hydrogenation reaction area | 1.4 | 1.5 | 1.5 | | |
| Third hydrogenation reaction area | 2 | 2 | 2 | | |
| Ratio of total hydrogen to oil, v/v | 400 | 400 | 400 | 400 | 400 |
| The amount of dissolved hydrogen in the third hydrogenation reaction area, m % | 1.3 | 1.3 | 1.3 | | |
| Reaction temperature, ° C. | | | | | |
| First hydrogenation reaction area | 280 | 285 | 290 | 330 | 350 |
| Gas-liquid separation area | 285 | 290 | 300 | | |
| Second hydrogenation reaction area | 315 | 320 | 330 | | |
| Third hydrogenation reaction area | 330 | 340 | 350 | | |
| Content of organic sulfur in naphtha, $\mu g \cdot g^{-1}$ | 0.8 | 0.8 | 0.7 | 1 | 0.8 |
| Content of organic sulfur in diesel, $\mu g \cdot g^{-1}$ | 9 | 7 | 8 | 9 | 9 |
| Content of aromatic hydrocarbons in diesel, v % | 22 | 21 | 18 | 25 | 24 |

As can be seen from Table B3, compared with the form in which the gas-liquid countercurrent reactor and the liquid-phase hydrogenation reactor are connected in series, the present invention increases the stability of the system, because the liquid-phase hydrogenation system and the gas-liquid countercurrent system are placed in the same reaction system, and can perform the smooth control of the hydrogen gas flow; in addition, a liquid phase space is arranged underneath the countercurrent region, so as to avoid a circumstance that the hydrogen gas introduced from the bottom of said reactor is carried out of the reactor by the liquid phase components before moving upwards and passing through the catalyst bed. At the same time, the hydrogen-dissolved component directly enters the liquid-phase reaction area, avoiding the escape of hydrogen gas, the effect of the hydrogenation reaction is better than that of the Comparative Example B1. Compared with the single use of the gas-liquid countercurrent reaction system, the present invention has compressibility due to a gas phase space additionally arranged above the countercurrent region, which is conducive to the stable control of the entire reaction system, the catalyst bed is not disturbed, and the hydrogenation reaction has desirable effects.

Examples C1-C3

A 100 mL fixed bed hydrogenation reactor was used in the Examples, as shown in FIG. 2, the fixed bed hydrogenation reactor comprise, arranged from top to bottom, a first hydrogenation reaction area a gas-liquid separation area, a second hydrogenation reaction area and a third hydrogenation reaction area. A hydrogen inlet is provided between the second hydrogenation reaction area and the third hydrogenation reaction area; a catalyst bed was arranged for each of the first hydrogenation reaction area, the second hydrogenation reaction area and the third hydrogenation reaction area disposed from top to bottom. The first hydrogenation reaction area was filled with the Ni—Mo type hydrorefining catalyst A, the second hydrogenation reaction area was filled with the Ni—Mo type hydrorefining catalyst B, the third hydrogenation reaction area was filled with the Ni—W isomerization catalyst C and the Ni—Mo type hydrorefining catalyst D in the gradation configuration, the volume ratio of said catalyst C and said catalyst D was 3:1. According to the reactor volume, the volume ratio the catalyst filled in the first hydrogenation reaction area, the second hydrogenation reaction area, and the third hydrogenation reaction area was 15:35:50. The aviation kerosene raw material with cut weight fraction entered the gas-liquid separation area from the raw oil inlet, and was subjected to a gas-liquid separation and separated into light aviation kerosene fraction and heavy aviation kerosene fraction; the light aviation kerosene fraction flowed upward and entered the first hydrogenation reaction area, the heavy aviation kerosene fraction flowed downward and entered the second hydrogenation reaction area, the hydrogen gas was introduced via a hydrogen inlet arranged between the second hydrogenation reaction area and the third hydrogenation reaction area; the hydrogen gas flowed upward and carried out the deep hydrodenitrogenation and aromatic hydrocarbons saturation reactions in the gas-liquid countercurrent reaction area with the heavy aviation fraction, the reacted material moved downward into the third hydrogenation reaction area for carrying out the isomerization and supplementary refining reaction to obtain a material D; the unreacted hydrogen gas continued to flow upward through the gas-liquid separation area into the first hydrogenation reaction area, and carried out hydrodethiol reaction with light aviation kerosene fraction to obtain a material C; the material D and the material C were blended to produce the high quality aviation kerosene products with a low freezing point and a high smoke point.

The catalyst properties were shown in Table C1, the properties of raw oil were shown in Table C2, the reaction process conditions and results were shown in Table C3.

Comparative Example C1

A conventional 100 mL fixed bed hydrotreating process was adopted, the raw materials were the same as those in the above-mentioned Examples, both the raw material and hydrogen gas entered the reactor from the top of said reactor. The catalyst A was filled in the first hydrogenation reaction area in Example C1, and the filling volume was equal to the sum of the volume of catalyst filled in the first hydrogenation reaction area, the second hydrogenation reaction area, and the third hydrogenation reaction area in Example C1. The total volumetric space velocity was the same as that in the Examples.

Comparative Example C2

The method of producing low freezing point aviation kerosene by isomerization and reducing condensation was used, the same raw material as those in the above Examples were introduced into the hydrotreating reactor (the reaction area was filled with the catalyst A in the Example C1), the isomerization reactor (the reaction area was filled with the catalyst C in the Example C1) and the supplementary refining reactor (the reaction area was filled with the catalyst D in the Example C1). The volume ratio of catalyst filled in the three reactors was 3:4:3, and the total filling volume was the same as that in Example C1. The total volumetric space velocity was the same as that in the Examples. The steam stripping and heat exchange device shall be installed between the hydrotreating reactor and the isomerization reactor, it was required to arrange a hydrogen inlet in each of the three reactors.

TABLE C1

Physicochemical properties of the catalysts

| No. | A | B | C | D |
|---|---|---|---|---|
| Active metal | Ni—Mo | Ni—Mo | Ni—W | Ni—Mo |
| Metal oxide content, m % | 23 | 30 | 28 | 21 |
| Mass ratio of oxidation state main metal (Mo, W) and auxiliary (Ni, Co) oxide | 3:1 | 5:1 | 3:1 | 9:1 |
| Shape | Clover | Clover | Cylinder | Clover |
| Carrier type | $\gamma$-$Al_2O_3$ | $\gamma$-$Al_2O_3$ | Y molecular sieve | $\gamma$-$Al_2O_3$ |
| Diameter, mm | 2.0 | 1.2 | 1.2 | 2.0 |
| Specific surface area, $m^2 \cdot g^{-1}$ | 220 | 240 | 180 | 220 |
| Pore volume, $mL \cdot g^{-1}$ | 0.26 | 0.30 | 0.35 | 0.26 |

TABLE C2

Properties of raw oil

| Oil properties | |
|---|---|
| Density (20° C.), $g \cdot cm^{-3}$ | 0.82 |
| Distillation range, ° C. | 140-310 |
| S, $\mu g \cdot g^{-1}$ | 1900 |
| N, $\mu g \cdot g^{-1}$ | 45 |
| Freezing point, ° C. | −43 |
| Smoke point, ° C. | 20 |

TABLE C3

Hydrogenation process conditions and results

| | Example C1 | Example C2 | Example C3 | Comparative Example C1 | Comparative Example C2 |
|---|---|---|---|---|---|
| Hydrogen partial pressure, MPa | | | | | |
| Inlet | 6.0 | 6.0 | 6.0 | 6.0 | |
| First hydrogenation reaction area | 2.5 | 3.0 | 3.0 | — | 6.0 |
| Second hydrogenation reaction area | 4.5 | 5.0 | 5.0 | — | 6.5 |
| Third hydrogenation reaction area | 5.0 | 5.0 | 5.0 | — | 3.0 |
| Volume space velocity, $h^{-1}$ | | | | | |
| First hydrogenation reaction area | 4 | 4.5 | 4.5 | 1 | 3.3 |
| Second hydrogenation reaction area | 1.3 | 1 | 1 | — | 2.5 |

TABLE C3-continued

| Hydrogenation process conditions and results | | | | | |
|---|---|---|---|---|---|
| | Example C1 | Example C2 | Example C3 | Comparative Example C1 | Comparative Example C2 |
| Third hydrogenation reaction area | 0.6 | 0.6 | 0.6 | — | 3.3 |
| Ratio of hydrogen to oil, v/v | 400 | 400 | 400 | 400 | 400 |
| The amount of dissolved hydrogen in the third hydrogenation reaction area, m % | 0.6 | 0.6 | 0.6 | | |
| Reaction temperature, ° C. | | | | | |
| First hydrogenation reaction area | 220 | 245 | 250 | 260 | 250 |
| Gas-liquid separation area | 250 | 255 | 265 | | |
| Second hydrogenation reaction area | 260 | 270 | 280 | | 320 |
| Third hydrogenation reaction area | 305 | 310 | 320 | | 260 |
| Aviation kerosene | | | | | |
| Mercaptan sulfur, µg/g | 2.0 | 1.3 | 0.6 | 4.3 | 1.0 |
| Freezing point, ° C. | −47 | −48 | −50 | −43 | −48 |
| Smoke point, mm | 25 | 26 | 28 | 22 | 28 |

Note:
In Table C3, reaction area I refers to the first hydrogenation reaction area, reaction area II refers to the second hydrogenation reaction area, and reaction area III refers to the third hydrogenation reaction area.

As indicated in Table C3, compared with the conventional fixed-bed hydrogenation process using the aviation kerosene fraction with cut weight fraction as the raw material, when the reaction conditions were the same, the method in the present invention can be used for producing high quality aviation kerosene products with qualified freezing point and smoke point. Compared with the method of producing low freezing point aviation kerosene by isomerization and reducing condensation, the method of the present invention has a simple process, the high quality aviation kerosene can be produced by merely using one reactor and taking advantages of the matching and optimization of the internal environment of the reactor.

The above content describes in detail the preferred embodiments of the present invention, but the present invention is not limited thereto. A variety of simple modifications can be made in regard to the technical solutions of the present invention within the scope of the technical concept of the present invention, including a combination of individual technical features in any other suitable manner, such simple modifications and combinations thereof shall also be regarded as the content disclosed by the present invention, each of them falls into the protection scope of the present invention.

The invention claimed is:

1. A multi-phase combination of reaction system, comprising a fixed bed hydrogenation reactor, wherein:
the fixed bed hydrogenation reactor comprises, from top to bottom, a first hydrogenation reaction area, a gas-liquid separation area, a second hydrogenation reaction area, and a third hydrogenation reaction area disposed in one reaction vessel;
the gas-liquid separation area is provided with an inlet for a feedstock oil;
a hydrogen inlet is provided between the second hydrogenation reaction area and the third hydrogenation reaction area;
the gas-liquid separation area is configured to separate a feedstock oil into a gas phase A and a liquid phase A;
the first hydrogenation reaction area is configured to carry out a first hydrogenation reaction between the gas phase A and hydrogen gas;
the second hydrogenation reaction area is configured to carry out a gas-liquid reaction between the liquid phase A and the hydrogen gas from the hydrogen inlet countercurrently to obtain a material B; and
the third hydrogenation reaction area is configured to carry out a third hydrogenation reaction of the material B.

2. The reaction system of claim 1, wherein the first hydrogenation reaction area, the second hydrogenation reaction area, and the third hydrogenation reaction area are respectively filled with a first hydrogenation catalyst, a second hydrogenation catalyst, and a third hydrogenation catalyst.

3. The reaction system of claim 1, further comprising a mixed hydrogen-dissolving component disposed between the second hydrogenation reaction area and the third hydrogenation reaction area, and wherein the mixed hydrogen-dissolving component is configured to facilitate dissolving hydrogen gas in said material B.

4. The reaction system of claim 1, wherein the gas-liquid separation area is provided with an enhanced flash evaporator and/or a liquid flash evaporation distributor that facilitates gas-liquid separation.

5. The reaction system of claim 1, wherein a top of said fixed bed hydrogenation reactor is provided with a light fraction discharge pipeline, and a bottom of said fixed bed hydrogenation reactor is provided with a heavy fraction discharge pipeline.

6. A reaction method carried out in a system comprising a fixed bed hydrogenation reactor, wherein the fixed bed hydrogenation reactor comprises, arranged from top to bottom, a first hydrogenation reaction area, a gas-liquid separation area, a second hydrogenation reaction area and a third hydrogenation reaction area disposed in one reaction vessel, the gas-liquid separation area is provided with a inlet for a feedstock oil, a hydrogen inlet is provided between the second hydrogenation reaction area and the third hydrogenation reaction area the method comprises:
- S1: subjecting the feedstock oil to a gas-liquid separation in the gas-liquid separation area to obtain a gas phase A and a liquid phase A;
- S2: introducing a hydrogen gas through the hydrogen inlet arranged between the second hydrogenation reaction area and the third hydrogenation reaction area, subjecting the hydrogen gas and the liquid phase A to a gas-liquid reaction countercurrently in the second hydrogenation reaction area to obtain a material B, wherein the material B contains hydrogen dissolved therein;
- subjecting unreacted hydrogen gas and the gas phase A to a first hydrogenation reaction in the first hydrogenation reaction area to obtain a material C; and
- S3: the material B downwardly entering the third hydrogenation area for carrying out a third hydrogenation reaction to obtain a material D.

7. The reaction method of claim 6, wherein the gas phase A is a naphtha fraction, and the liquid phase A is a diesel fraction;
- wherein, in S2, the hydrogen gas and the liquid phase A are subject to hydrodesulfurization and hydrodenitrogenation in the second hydrogenation reaction area to obtain the material B; and
- the unreacted hydrogen gas and the gas phase A are subject to hydrodesulfurization, hydrodenitrogenation, and olefin saturation in the first hydrogenation reaction area, and the material C is an ethylene cracking raw material of the naphtha fraction;
- wherein, in S3, the material B is subject to selective hydrogenation, saturation, and ring-opening reactions of polycyclic aromatic hydrocarbons, and the material D is an ethylene cracking raw material of the diesel fraction.

8. The reaction method of claim 7, wherein:
- a volumetric ratio of a total amount of hydrogen gas to the feedstock oil in the fixed bed hydrogenation reactor is 10:1-800:1;
- and/or, the first hydrogenation reaction area is filled with a light distillate oil hydrogenation catalyst;
- and/or, the first hydrogenation reaction area is operated at a total pressure of 1.0-12.0 MPa, a hydrogen partial pressure of 40%-70% of the total pressure, a volumetric space velocity of 0.1-10.0 h$^{-1}$, and a reaction temperature of 100-350° C.;
- and/or, the feedstock oil is at a temperature of 150-300° C.;
- and/or, the second hydrogenation reaction area is filled with a diesel hydrogenation catalyst;
- and/or, the second hydrogenation reaction area is operated at a total pressure of 1.0-12.0 MPa, a hydrogen partial pressure of 50%-90% of the total pressure, a volumetric space velocity of 0.1-10.0 h$^{-1}$, and a reaction temperature of 200-400° C.;
- and/or, the third hydrogenation reaction area is filled with a diesel hydrogenation-upgrading catalyst;
- and/or, the third hydrogenation reaction area is operated at a total pressure of 1.0-12.0 MPa, a volumetric space velocity of 0.1-8.0 h$^{-1}$, and a reaction temperature of 200-400° C., wherein an amount of dissolved hydrogen in the material B is within a range of 0.05-2.0 m %.

9. The reaction method of claim 6,
- wherein, in S2, the hydrogen gas and the liquid phase A in are subject to a hydrogenation reaction in the second hydrogenation reaction area to obtain the material B;
- the unreacted hydrogen gas and the gas phase A are subject to hydrodesulfurization, hydrodenitrogenation, and olefin saturation reactions in the first hydrogenation reaction area to obtain the material C; and
- in S3, the material B is subject to hydrodesulfurization and dearomatization reactions in the third hydrogenation reaction area to obtain the material D.

10. The reaction method of claim 9, wherein,
- a volumetric ratio of a total amount of hydrogen gas to the feedstock oil in the fixed bed hydrogenation reactor is 10:1-800:1;
- and/or, the first hydrogenation reaction area is filled with a light distillate oil hydrogenation catalyst;
- and/or, the first hydrogenation reaction area is operated at a total pressure of 1.0-80 MPa, a hydrogen partial pressure of 30%-80% of the total pressure, a volumetric space velocity of 0.1-10.0 h$^{-1}$, and a reaction temperature of 200-380° C.;
- and/or, the second hydrogenation reaction area is filled with the light distillate oil hydrogenation catalyst, and/or a diesel fraction hydrodesulfurization catalyst;
- and/or, the second hydrogenation reaction area is operated at a total pressure of 2.0-10.0 MPa, a hydrogen partial pressure of 50%-90% of the total pressure, a volumetric space velocity of 0.1-5.0 h$^{-1}$, and a reaction temperature of 220-420° C.;
- and/or, the third hydrogenation reaction area is filled with the light distillate hydrogenation catalyst;
- and/or, the third hydrogenation reaction area is operated at a pressure of 2.0-10.0 MPa, a volumetric space velocity of 0.1-8.0 h$^{-1}$, a reaction temperature of 220-420° C., the third hydrogenation reaction area is a pure liquid phase reaction area, the and an amount of dissolved hydrogen in the material B is within a range of 0.1-3.0 m %;
- and/or, a temperature of the feedstock oil is 150-380° C.;
- and/or, a temperature of the second hydrogenation reaction area is 5-30° C. higher than a temperature of the gas-liquid separation area.

11. The reaction method of claim 6, wherein the feedstock oil is a weight fraction of an aviation kerosene;
- wherein, in S2, the hydrogen gas and the liquid phase A are subject to deep hydrodenitrogenation and aromatic hydrocarbon saturation reactions in the second hydrogenation reaction area to obtain the material B;
- in S3, the material B is subject to isomerization and supplementary refining reactions in the third hydrogenation reaction area to obtain the material D;
- the unreacted hydrogen gas and the gas phase A are subject to a hydrodethiol reaction in the first hydrogenation reaction area to obtain the material C; and
- wherein the material C and the material D are blended to obtain an aviation kerosene product.

12. The reaction method of claim 11, wherein:
- the gas phase A is a light aviation kerosene fraction below 260° C., and the liquid phase A is a heavy aviation kerosene fraction above 260° C.;

and/or, the volume ratio of the total hydrogen to the feedstock oil in the fixed bed hydrogenation reactor is 10:1-800:1;

and/or, a temperature of the feedstock in the gas-liquid separation area is 200-300° C.;

and/or, the first hydrogenation reaction area is filled with a hydrodethiol catalyst;

and/or, the first hydrogenation reaction area is operated at a total pressure of 1.0-8.0 MPa, a hydrogen partial pressure of 40%-80% of the total pressure, a volumetric space velocity of 0.1-10.0 $h^{-1}$, and a reaction temperature of 150-280° C.;

and/or, the second hydrogenation reaction area is filled with a diesel hydrogenation catalyst;

and/or, the second hydrogenation reaction area is operated at a total pressure of 1.0-8.0 MPa, a hydrogen partial pressure of 50%-90% of the total pressure, a volumetric space velocity of 0.1-10.0 $h^{-1}$, and a reaction temperature of 200-380° C.;

and/or, the third hydrogenation reaction area is filled with an isomerization catalyst and a refining catalyst;

and/or, the third hydrogenation reaction area is operated at a total pressure of 1.0-8.0 MPa, a volumetric space velocity of 0.1-8.0 $h^{-1}$, and a reaction temperature of 200-400° C., and an amount of dissolved hydrogen in the material B is within a range of 0.1-3.0 m %.

13. The reaction system of claim 5, wherein, the light fraction discharge pipeline is connected with the heavy fraction discharge pipeline to blend a light fraction obtained from the light fraction discharge pipeline and a heavy fraction obtained from the heavy fraction discharge pipeline.

14. The reaction method of claim 7, wherein the feedstock oil has a distillation range of 40-370° C., a content of S not larger than 12,000 μg/g, a content of N not larger than 300 μg/g, and a content of polycyclic aromatic hydrocarbons not larger than 50 wt %.

15. The reaction method of claim 9, wherein the feedstock oil is a mixture of an inferior gasoline fraction and a diesel fraction, the gasoline fraction has a distillation range of 30-200° C.; and the diesel fraction has a distillation range 160-380° C.

16. The reaction method of claim 15, wherein the feedstock has a content of S not larger than 20,000 μg/g, a content of N not larger than 3,000 μg/g, and a content of polycyclic aromatic hydrocarbons not larger than 30 wt %.

17. The reaction method of claim 9, further comprising subjecting the material C to steam stripping or fractionation to obtain naphtha.

18. The reaction method of claim 9, further comprising subjecting the material D to a steam stripping or fractionation to obtain diesel.

19. The reaction method of claim 11, wherein the weight fraction of aviation kerosene has a distillation range of 120-320° C., a freezing point not larger than −10° C., and a smoke point not lower than 10 mm.

20. The reaction method of claim 12, wherein a volume ratio of the isomerization catalyst and the refining catalyst is within a range of 1:1-5:1.

* * * * *